(12) United States Patent
Kalabic et al.

(10) Patent No.: US 11,167,795 B2
(45) Date of Patent: Nov. 9, 2021

(54) METHOD AND SYSTEM FOR DETERMINING DRIVER INTENTION IN SEMI-AUTONOMOUS VEHICLE STEERING

(71) Applicant: Mitsubishi Electric Research Laboratories, Inc., Cambridge, MA (US)

(72) Inventors: Uros Kalabic, Jamaica Plain, MA (US); Rien Quirynen, Boston, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 338 days.

(21) Appl. No.: 16/365,912

(22) Filed: Mar. 27, 2019

(65) Prior Publication Data

US 2020/0307691 A1    Oct. 1, 2020

(51) Int. Cl.
*B62D 15/02*    (2006.01)

(52) U.S. Cl.
CPC ....... *B62D 15/025* (2013.01); *B62D 15/0255* (2013.01)

(58) Field of Classification Search
CPC .................. B62D 15/0255; B62D 15/025
See application file for complete search history.

(56) References Cited

U.S. PATENT DOCUMENTS

| 2014/0156133 | A1  | 6/2014  | Cullinane et al. |
| 2015/0314729 | A1* | 11/2015 | Edgren .............. B60W 50/16 340/438 |
| 2018/0154939 | A1* | 6/2018  | Aoki ................. B62D 15/025 |
| 2018/0239352 | A1* | 8/2018  | Wang ................ B60W 30/182 |
| 2019/0086917 | A1* | 3/2019  | Okimoto ........... B60W 30/00 |
| 2019/0094856 | A1* | 3/2019  | Kawate ............. B60W 50/082 |
| 2019/0126925 | A1* | 5/2019  | Ryne ................. B60W 50/14 |
| 2019/0212749 | A1* | 7/2019  | Chen ................. B62D 15/0255 |
| 2019/0300053 | A1* | 10/2019 | Mizoguchi ........ B62D 15/0255 |

* cited by examiner

*Primary Examiner* — Russell Frejd
*Assistant Examiner* — Demetra R Smith-Stewart
(74) *Attorney, Agent, or Firm* — Gennadiy Vinokur; Hironori Tsukamoto

(57) ABSTRACT

Methods and systems including processor configured to receive a transition indication to switch a semi-autonomous vehicle from a driving mode to another driving mode while a driver is driving the vehicle on a roadway. Wherein the driving modes include an autonomous lane keeping mode, an autonomous lane change mode and a manual mode. In response to receiving the request, use protocol data to assess a status of the vehicle's environment, a vehicle state and systems of the vehicle. Select, a set of conditions corresponding to the vehicle's state, based on one or more of the assessments. Determine, whether a switch between driving modes is initiated by the driver, by verifying if the vehicle's state satisfies the set of conditions, in order to validate if the driver actuated the vehicle into or out of a safety region.

21 Claims, 15 Drawing Sheets

METHOD AND SYSTEM FOR DETERMINING DRIVER INTENTION IN SEMI-AUTONOMOUS VEHICLE STEERING

FIELD

The present disclosure relates generally to autonomous driving and driver-assistance systems, and, more particularly, to determining driver intention to switch a semi-autonomous vehicle between autonomous and manual modes.

BACKGROUND

Conventional autonomously driving vehicles must be equipped with a control system that assists with vehicle safety in terms how the vehicle should move on the road, accounting legal driving rules and traffic, to achieve its driving objectives. The conventional control system determines the vehicle motion by analyzing the environment based on data acquired by the sensors and processed by recognition and mapping algorithms, by computing a vehicle path and speed, and by control the vehicle to follow that path using available vehicle actuators. Due to the complexity of such conventional operations, the conventional control system includes vehicle control. For instance, U.S. Pat. No. 6,356,819 discusses how the vehicle control can be integrated to guarantee that the vehicle achieves safe operation for an operator. The vehicle control can determine whether the operator can take control of the vehicle, and if the operator is not ready to take control of the vehicle, the vehicle can be disabled.

For example, in some conventional semi-autonomous automotive vehicles responsibility of driving is divided between a human driver an on-board electronic system. As such, semi-autonomous can generally be said to operate in manual or autonomous modes. At lower levels of autonomy, switching between the two modes depends on an intent of the driver, i.e., the driver decides the mode of operation. This is usually achieved, conventional semi-autonomous automotive systems for vehicles, by pressing a button to change from one mode to the other or, in autonomous mode, actuating the vehicle in such a way that the system determines a large disagreement between what the system is doing and what the driver intends for the system to do. The latter is important in emergency situations, where the driver may not have the presence of mind to make a switch to manual mode in an orderly manner. What is typically missing in the state of the art is how to make sure that this switch is safe and orderly without resorting to an ad hoc method.

Accordingly, there is a need in semi-autonomous automotive vehicle technology to develop how to make sure that switching between the two modes, i.e. manual or autonomous modes, is safe and orderly, without resorting to an ad hoc method that is outdated, as in the conventional semi-autonomous automotive vehicle technology and in view of today's semi-autonomous automotive vehicle technological demands.

SUMMARY

The present disclosure relates generally to autonomous driving and driver-assistance systems, and, more particularly, to determining driver intention to switch a semi-autonomous vehicle between autonomous and manual modes. For example, some embodiments of the present disclosure are directed to steering systems that operate in both autonomous and manual driving modes, and more particularly, to control a mobile machine that transports things, based on steering intentions of a driver of the mobile machine.

Some embodiments of the present disclosure provide a method and system that determines driver intention to switch a semi-autonomous vehicle between autonomous and manual modes. In all modes, the driver can actuate the vehicle control system solely using the steering wheel. At least one realization gained from experimentation is to have a system of the present disclosure determine a driver's intention by checking whether the vehicle's current state satisfies certain pre-defined transition conditions. Wherein, three modes can be considered, including: (MODE 1) autonomous, lane-keeping mode; (MODE 2) autonomous, lane-change mode; and (MODE 3) manual mode.

Another realization is to test transitions, i.e. switching from one mode to another mode of the above 3 modes, primarily by checking whether the vehicle state lies in a safety region; in the case of transition, for example, from MODE 1 (autonomous, lane-keeping mode) to MODE 2 (autonomous, lane change), the system of the present disclosure can additionally compare whether a cost of tracking a center lane of a road is greater than a cost of tracking a lane-change trajectory, by non-limiting example.

Other embodiments of the present disclosure can determine if a semi-autonomous vehicle's autonomous driving system or vehicle control system, should take control away from the driver or give control to the driver. For example, some systems and methods of the present disclosure can consist of a vehicle that can operate in both manual and autonomous modes. In manual mode, the vehicle behaves like an ordinary vehicle without autonomous capabilities. In autonomous mode, the vehicle can be actuated by an electronic system, tracking the highway center-lane at a safe speed while making sure that the vehicle keeps a safe distance from another vehicle directly in front. In autonomous mode, the driver is still able to actuate the vehicle control system, by moving the steering wheel to actuate the vehicle wheels. In this way, autonomous mode still allows for manual input, among other aspects.

Because manual input is allowed, the systems and methods of the present disclosure provide for the possibility to obtain the driver intention from the vehicle motion in autonomous mode. Specifically, if the vehicle moves in a direction that is not intended by the vehicle's control system, then the intention must be the driver's. Therefore, the systems and methods of the present disclosure are able to provide for the possibility to obtain to determine the driver's intention from the vehicle motion, among other aspects. At the same time, care is taken to determine if the driver truly intended a motion for the vehicle or if it was unintentional. Learned through extensive experimentation, the systems and methods of the present disclosure presents a set of logical tests that can determine driver intention.

As stated previously, the vehicle operates in both manual and autonomous modes. The three modes considered, include: (MODE 1) autonomous, lane-keeping mode; (MODE 2) autonomous, lane-change mode; and (MODE 3) manual mode. Note, that in an autonomous operation this further divided into two sub-modes: lane-keeping (MODE 1) and lane-change modes (MODE 2). Thus, some systems and methods of the present disclosure can define the switches between three modes: (MODE 1) autonomous, lane-keeping mode; (MODE 2) autonomous, lane-change mode; and (MODE 3) manual mode. Logical tests can be performed to determine if a switch between modes has been initiated by the driver. For example, the logic tests depend on whether the driver has actuated the vehicle into or out of an appropriate "safety region", which is a set of vehicle states from which the vehicle can operate the vehicle safely in the corresponding mode. These "set of vehicle states" were learned through experimentation. Further, safety is defined using constraints, which are determined by a designer of the switching system.

According to some embodiments of the present disclosure, the safety set is designed based on safety constraints and vehicle dynamics being aspects of a safety region. Another realization of the present disclosure is to develop four safety regions. The four safety regions can be associated with each switching action from one mode to another mode of the three modes, i.e. (MODE 1) autonomous, lane-keeping mode; (MODE 2) autonomous, lane-change mode; and (MODE 3) manual mode.

For example, a first safety region can correspond to the switch from MODE 3 (manual mode) to MODE 1 (lane-keeping mode). This first safety region is the set of all states that will ensure that the autonomous controller can safely take over control, track the center-lane, and enforce safety constraints. When the system of the present disclosure is in manual mode (MODE 3), the logic tests if the first safety region has been entered. If it has, it determines that an autonomous take-over has been initiated.

The second safety region corresponds to the switch from MODE 1 (autonomous, lane-keeping mode) to MODE 2 (autonomous, lane-change mode). This second safety region is the set of all states that will ensure that the autonomous controller can safely begin a lane change. When the system of the present disclosure is in lane-keeping mode (MODE 1), the logic tests if the second safety region has been entered. If it has, it performs an additional test to determine if a lane-change has been initiated. This additional test compares the effort needed to resume lane-keeping versus the effort needed to perform a lane change. If, in addition to the first test, less effort is needed to switch lanes, the system of the present disclosure determines that a lane change has been initiated.

The third safety region corresponds to the switch from MODE 1 (autonomous, lane-keeping mode) to MODE 3 (manual mode). This third safety region is the set of all states that will ensure that the autonomous controller will track the center-lane and enforce safety constraints. When the system of the present disclosure is in lane-keeping mode (MODE 1), the logic tests if the safety constraint has been violated. If it has, and simultaneously a lane change has not been initiated, it determines that a manual take-over has been initiated.

The fourth safety region corresponds to the switch from MODE 2 (autonomous, lane-change mode) to MODE 3 (manual mode). This fourth safety region is the set of all states that will ensure that the autonomous controller will do a lane change (MODE 2) and enforce safety constraints. When the system of the present disclosure is in lane-change mode, the logic tests if the safety constraint has been violated. If it has, it determines that a manual take-over has been initiated.

The switch from MODE 2 (autonomous, lane-change mode) back to MODE 1 (autonomous, lane-keeping mode) can be based on whether the lane change has been completed. A lane change is determined to have been completed when the lane change trajectory converges to the center of the new lane.

According to an embodiment of the present disclosure, a method including receiving a transition indication from a processor, to switch a semi-autonomous vehicle from a driving mode to another driving mode while a driver is driving the vehicle on a roadway. Wherein the driving modes include an autonomous lane keeping mode, an autonomous lane change mode and a manual mode. Using the processor that is configured to in response to receiving the transition indication, using, protocol data to assess (i) a status of the vehicle's environment, (ii) a vehicle state of the vehicle, and (iii) systems of the vehicle. Selecting, a set of pre-defined transition conditions from a plurality of pre-defined transition conditions that correspond uniquely to the vehicle's state, based on one or more of the assessments. Determining, whether a switch between driving modes has been initiated by the driver, by verifying if the vehicle's state satisfies the set of pre-defined transition conditions, in order to validate if the driver actuated the vehicle into or out of a safety region. Generating a set of displays based on the determination whether the driver actuated the vehicle into or out of the safety region. Selecting, as a first display of the set of displays based on a priority of the displays, if the driver actuated the vehicle into the safety region, or selecting a second display, if the driver actuated the vehicle out of the safety region. Displaying either the first display or the second display to the driver, that results in either confirming the transition indication or initiating switching the vehicle from a manual driving mode to an autonomous driving mode.

According to another embodiment of the present disclosure, a system comprising one or more processors configured to receive a transition indication to switch a semi-autonomous vehicle from a driving mode to another driving mode while a driver is driving the vehicle on a roadway. Wherein the driving modes include an autonomous lane keeping mode, an autonomous lane change mode and a manual mode. In response to receiving the request, use protocol data to assess (i) a status of the vehicle's environment, (ii) a vehicle state of the vehicle, and (iii) systems of the vehicle. Select, a set of pre-defined transition conditions from a plurality of pre-defined transition conditions that correspond to the vehicle's state, based on one or more of the assessments. Determine, whether a switch between driving modes has been initiated by the driver, by verifying if the vehicle's state satisfies the set of pre-defined transition conditions, in order to validate if the driver actuated the vehicle into or out of a safety region. Generate a set of displays based on the determination whether the driver actuated the vehicle into or out of the safety region. Select, as a first display of the set of displays based on a priority of the displays, if the driver actuated the vehicle into the safety region, or selecting a second display, if the driver actuated the vehicle out of the safety region. Display either the first display or the second display to the driver, that results in either confirming the transition indication or initiating switching the vehicle from a manual driving mode to an autonomous driving mode.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments. Some embodiments of present disclosure are directed to automotive steering systems, which operate in both autonomous and manual driving modes, and more particularly, to control of a vehicle based on steering intentions of a driver of the vehicle.

FIG. 6A illustrates a position from reference lane, FIG. 6B illustrates a relative rate of change of position, and FIG. 6C illustrates dimensionless force feedback command sent to the gaining wheel (±10 are saturation bounds), wherein for FIGS. 6A, 6B and 6C the vertical lines signify a transition to autonomous mode, according to results from experimentation, according to the present disclosure;

FIG. 7A illustrates a position from reference lane and FIG. 7B illustrates a relative rate of change of position, wherein the vertical lines of FIGS. 7A & 7B, signify initiations and completions of lane changes, according to results from experimentation, according to the present disclosure;

FIG. 8A illustrates steering wheel position and FIG. 8B illustrates cost of lane-keeping (dark) and cost of lane change (light); vertical lines signify initiations and completions of lane changes, according to results from experimentation, according to the present disclosure;

FIG. 9A illustrates position from reference lane and FIG. 9B illustrates steering wheel position, wherein the vertical lines of both FIG. 9A and FIG. 9B signify a transition to autonomous mode or an initiation of lane change, according to results from experimentation, according to the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art, which fall within the scope and spirit of the principles of the presently disclosed embodiments.

DETAILED DESCRIPTION

The present disclosure relates generally to autonomous driving and driver-assistance systems, and, more particularly, to determining driver intention to switch a semi-autonomous vehicle between autonomous and manual modes.

Figure 1A:
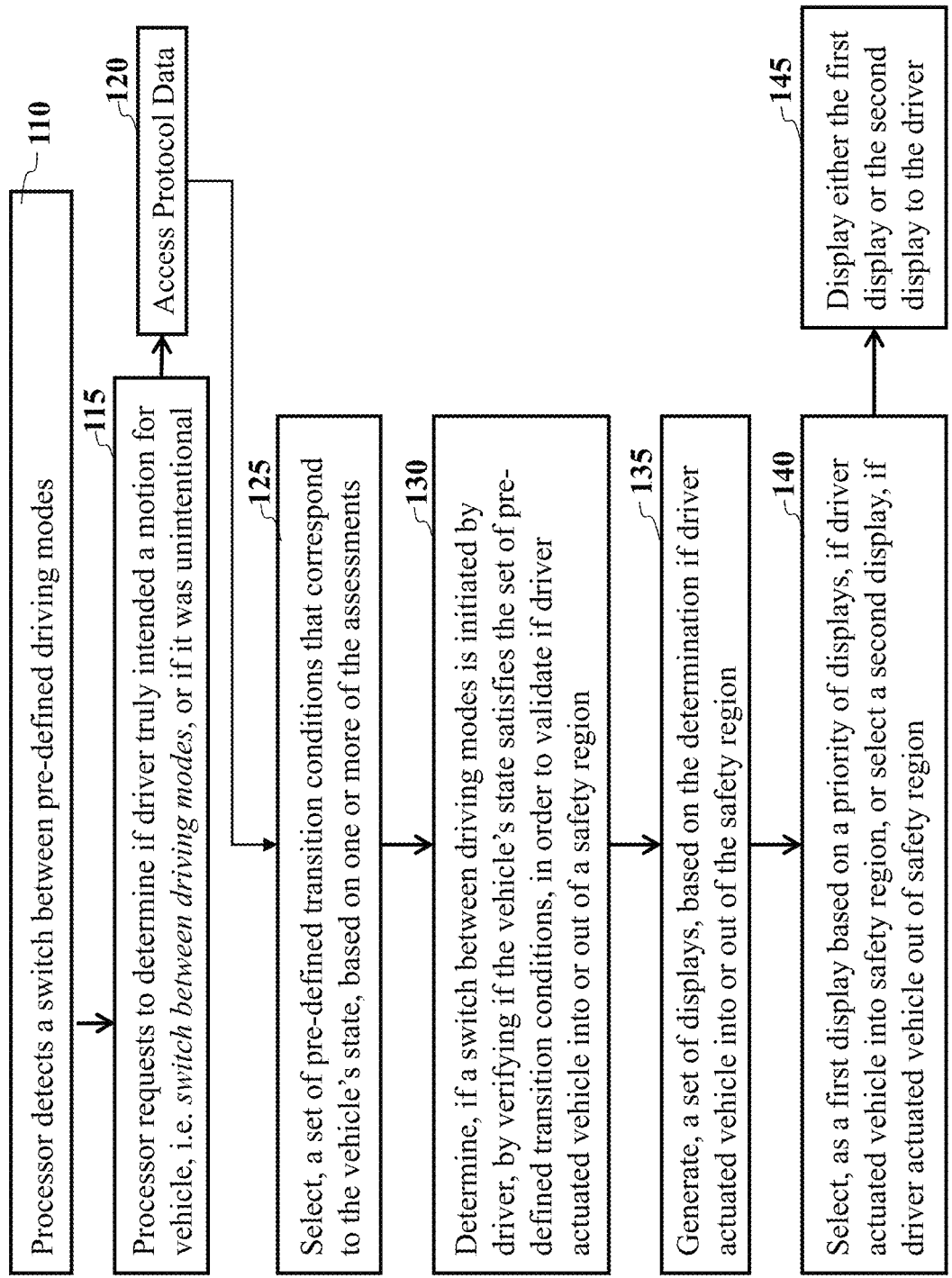
FIG. 1A is a schematic diagram illustrating some system and method steps for determining driver intention to switch a semi-autonomous vehicle between autonomous and manual modes, according to an embodiment of the present disclosure.

FIG. 1A is a flow diagram illustrating some method steps for implementing a method, according to embodiments of the present disclosure.

Step 110 of FIG. 1A includes the processor detects a switch between pre-defined driving modes.

Step 115 of FIG. 1A includes the processor requests to determine if driver truly intended a motion for vehicle, i.e. switch between driving modes, or if it was unintentional, wherein the driving modes include an autonomous lane keeping mode, an autonomous lane change mode and a manual mode.

Step 120 of FIG. 1A includes using the processor that is configured to, in response to receiving the transition indication, using, protocol data to assess (i) a status of the vehicle's environment, (ii) a vehicle state of the vehicle, and (iii) systems of the vehicle.

Step 125 of FIG. 1A includes selecting, a set of pre-defined transition conditions from a plurality of pre-defined transition conditions that correspond uniquely to the vehicle's state, based on one or more of the assessments.

Step 130 of FIG. 1A includes determining, whether a switch between driving modes has been initiated by the driver, by verifying if the vehicle's state satisfies the set of pre-defined transition conditions, in order to validate if the driver actuated the vehicle into or out of a safety region.

Step 135 of FIG. 1A includes generating, a set of displays, based on the determination whether the driver actuated the vehicle into or out of the safety region.

Step 140 of FIG. 1A includes selecting, as a first display of the set of displays based on a priority of the displays, if the driver actuated the vehicle into the safety region, or selecting a second display, if the driver actuated the vehicle out of the safety region.

Step 145 of FIG. 1A includes displaying either the first display or the second display to the driver, that results in either confirming the transition indication or initiating switching the vehicle from a manual driving mode to an autonomous driving mode.

Embodiments of the present disclosure provide unique aspects, by non-limiting example, the ability to design a safety region for switching using information about system dynamics and behavior; the ability to determine a safety region algorithmically given a desired design; reduction of jitter when switching between modes as compared to an ad hoc method. Designing a safety region for switching using information about system dynamics and behavior is a benefit because a safety region can be determined automatically without knowledge of the underlying system dynamics and behavior, reducing amount of time spent in experimentation and reducing the need for expertise on part of the designer. This benefit is achieved by implementing an algorithm that takes into account system dynamics and behavior to determine the safety region, as opposed to an ad hoc method, where the safety region is directly determined by the designer without appealing to an algorithm. Determining a safety region algorithmically given a desired design is a benefit because the designer can provide a set of requirements and the safety region can be determined algorithmically from there, reducing amount of time spent in experimentation and reducing the need for expertise on part of the designer. This benefit is achieved by implementing an algorithmic procedure to determine the safety region, as opposed to an ad hoc method, where the safety region is directly determined by the designer without appealing to an algorithm. Reduction of jitter when switching between modes as compared to an ad hoc method is benefit because jitter can cause instability in the system. This benefit is achieved because safety regions are designed so that they are harder to leave than enter; ad hoc methods do not make this distinction.

Figure 1B:
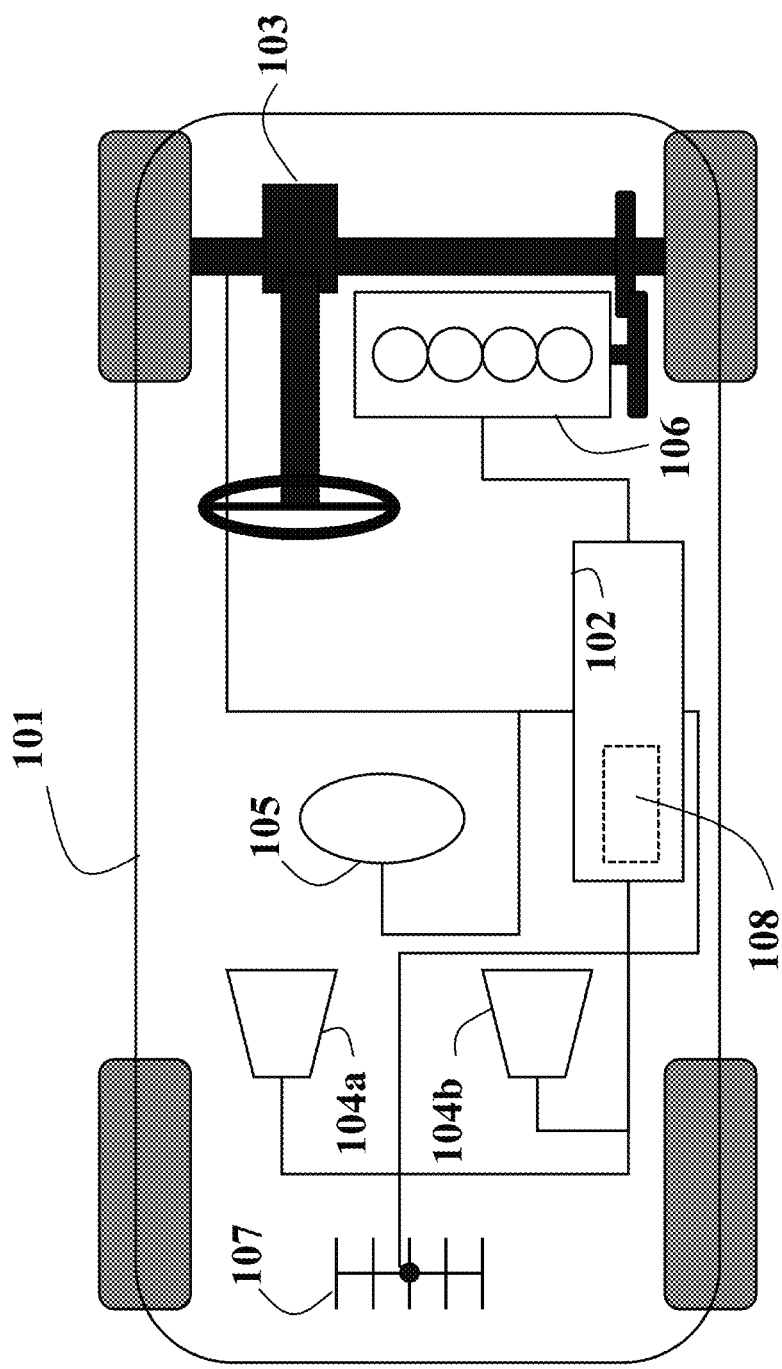
FIG. 1B is a schematic of a vehicle including a vehicle control system employing principles of some embodiments of the present disclosure.

FIG. 1B is a schematic of a vehicle including a control unit employing principles of some embodiments of the present disclosure. For example, FIG. 1B shows a schematic of a vehicle 101 including a control unit 102 employing principles of some embodiments of the present disclosure. As used herein, the vehicle 101 can be any type of wheeled vehicle, such as a passenger car, bus, or rover. In addition, the vehicle 101 can be an autonomous or semi-autonomous vehicle. For example, some embodiments control the motion of the vehicle 101. Examples of the motion include lateral motion of the vehicle controlled by a steering system 103 of the vehicle 101. The controller 102 controls the steering system 103.

The vehicle can also include an engine 106, which can be controlled by the controller 102 or by other components of the vehicle 101. The vehicle 101 can also include one or more sensors 105 to sense, by non-limiting example, its current motion quantities and internal status. Examples of the sensors 105 can include global positioning system (GPS), accelerometers, inertial measurement units, gyroscopes, shaft rotational sensors, torque sensors, deflection sensors, pressure sensor, and flow sensors. The vehicle can be equipped with a transceiver 107 enabling communication capabilities of the controller 102 through wireless communication channels via an input interface 108. The vehicle can also include one or more other sensors 104a, 104b to sense the surrounding environment. Examples of the sensors 104a, 104b can include distance range finders, radars, lidars, and cameras. Alternatively, information about the surrounding environment can be received through the transceiver 107. The vehicle is equipped with map database system that stores information about the road in the area where the vehicle operates, or it can access map information stored remotely through the transceiver 107.

Figure 1C:
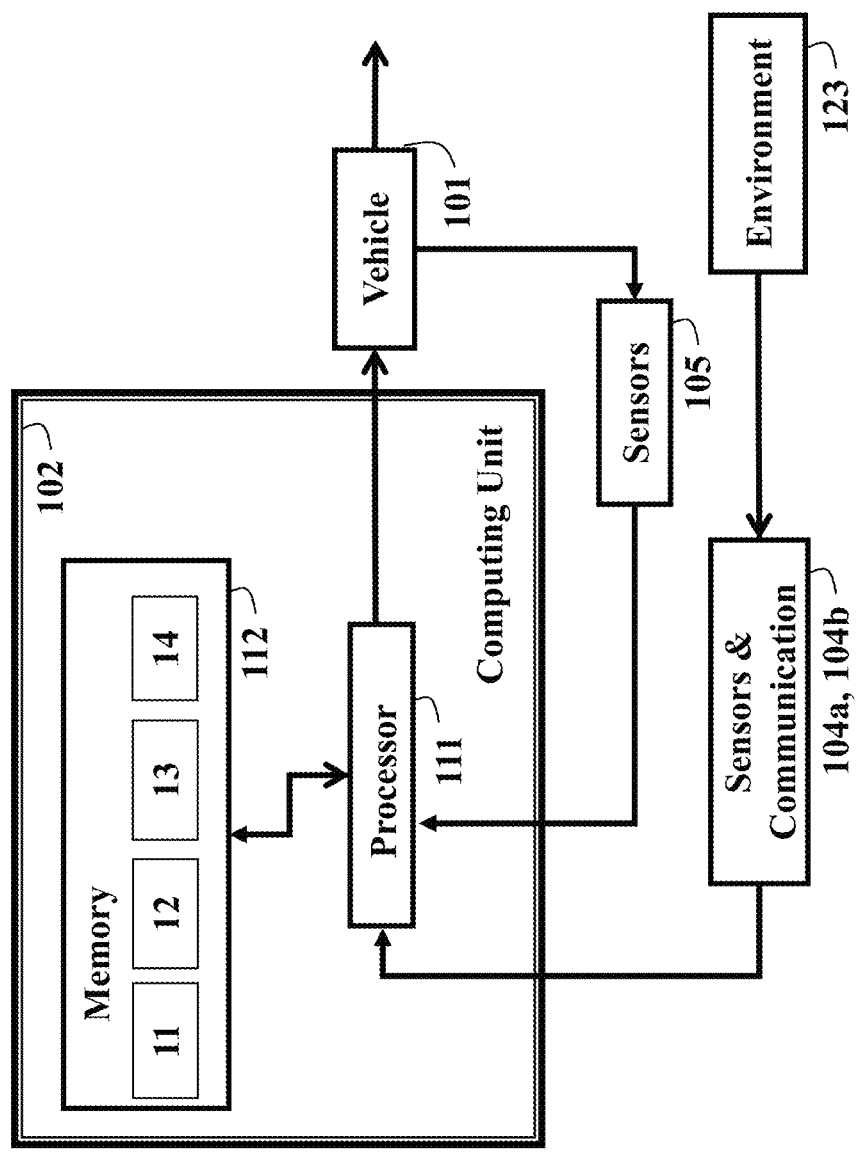
FIG. 1C is a block diagram of the vehicle control system, according to some embodiments of the present disclosure.

FIG. 1C is a block diagram according to some embodiments of the present disclosure. For example, FIG. 1C shows a block diagram of the control unit 102 according to one embodiment of the present disclosure. The controller 102 includes a hardware processor 111 connected to a memory 112, e.g., a non-transitory computer readable medium. In some implementations, the memory 112 includes a first section 11 for storing information about the vehicle and a second section 12 for storing a program for controlling the vehicle, a third section 13 for storing driving map data, and a fourth section 14 for storing motion models of the traffic.

For example, the first section 11 of the memory 112 can store parameters for the behavior of the vehicles, such as maximum acceleration, steering, and steering rate, as well as store a first model of motion of the vehicle and a second model of the motion of the vehicle. In various embodiments, the number and complexity of equations describing the second model of motion of the vehicle is higher that the number and complexity of equations describing the first model of motion of the vehicle. In addition, for example, the fourth section 14 of the memory 112 can store a first model of motion of the traffic and a second model of the motion of the traffic.

Still referring to FIG. 1C, in various embodiments, the number and complexity of equations describing the second model of motion of the traffic is higher that the number and complexity of equations describing the first model of motion of the traffic. Those embodiments are based on recognition of the necessity to use different motion models for checking what intermediate objectives the vehicle may be able to achieve in the near future, and for generating the trajectory and for controlling the vehicle according to such a trajectory. For example, in order to check if the vehicle is capable of achieving a sequence of goals, a long future horizon needs to be considered. Having a high order physical model to compute the motion of the vehicle over the extended future horizon is computationally difficult. Conversely, when the immediate goal is known, the control of the vehicle according to the desired trajectory can consider only a short future horizon. To that end, in some embodiments, the controller 102 determines the next goal using the first, i.e., low order motion model, while planning and control uses at least a second, i.e., higher order, motion model.

The second section 12 of the memory 112 can have embodied thereon a program executable by the processor 111 for performing a method for controlling the vehicle 101.

Still referring to FIG. 1C, the third section 13 of the memory 112 includes map information, such as addresses and road networks, and it may also include additional information such as intersections, stop and traffic light locations, number and position of lanes, speed limit, etc. The map information may be stored already in the third section of the memory 13 when the vehicle starts driving, or alternatively, this information is made available to the control unit by the communication transceiver 107 and the environment sensors 104a, 104b.

The processor 111 can be any computational device capable of performing computations, and can include one or many physical devices of the same or of different types. It is possible that the processor 111 can include multiple computational devices, e.g., microprocessors. Similarly, the memory 112 can be any logical memory and/or non-transitory computer readable storage medium capable of storing information, and can include one or more physical information storage means, of the same or of different types. The computations performed by the processor 111 are commanded by the program stored in the second section of the memory 112, and use the vehicle information stored in the first section of the memory 111, the information about the map stored in the second section of the memory 13, the information about the vehicle 101 obtained from the sensors 105, the information of the environment 123 obtained from the sensors 104a, 104b. The computation of the processor 111 results in commands that change the motion of the vehicle.

Still referring to FIG. 1C, the program executed by the processor 111 enables autonomous driving (AD) of the vehicle 101. During this operation, the program executed by the processor 111 aims at achieving specific final objective of driving, such as reaching a specific location. The final objective is achieved by appropriately influencing the motion of the vehicle 101. The software program executed by the processor 111 can logically be separated into multiple modules. For example, in one embodiment, the program executed by the processor includes at least two modules arranged in a sequence as layers such that output of one layer is an input to a next layer. As used herein, such layering specifies layers or logical modules of the control unit 102, and allows separating the control into different stages requiring different information.

Contemplated by not shown in FIG. 1C, is that an autonomous driving system can include a vehicle that can include cars, trucks, motorcycles, busses, boats, airplanes, helicopters, lawnmowers, recreational vehicles, amusement park vehicles, farm equipment, construction equipment, trains, golf carts, trains, and trolleys. The vehicle may have one or more computers, such as computer containing a processor and memory. The memory can store information accessible by processor, including instructions and data that can be executed and used by the processor. The memory can include a computer-readable medium, that stores data that may be read with the aid of a hard-drive, memory card, and read-only memories. The instructions may be any set of instructions to be executed directly (such as machine code) or indirectly (such as scripts) by the processor. The data may be retrieved, stored or modified by processor in accordance with the instructions. The processor may be located remote from the vehicle and communicate with the vehicle wirelessly.

The computer may include all of the components normally used in connection with a computer such as a central processing unit (CPU), memory (e.g., RAM and internal hard drives) storing data and instructions such as a web browser, an electronic display (e.g., a monitor having a screen, a small LCD touch-screen or any other electrical device that is operable to display information), user input (e.g., a mouse, keyboard, touch screen and/or microphone), as well as various sensors (e.g., a video camera) for gathering explicit or implicit information about the states and aspects of a person. The computer may be an autonomous driving computing system incorporated into vehicle.

Also, contemplated but not shown in FIG. 1C, is interior aspects of the vehicle. The autonomous vehicle may include all of the features of a non-autonomous vehicle, for example: a steering apparatus, such as steering wheel; a navigation display apparatus, such as navigation display (which may be a part of electronic display); and a gear selector apparatus, such as gear shifter. The vehicle may also have various user input devices in addition to the foregoing, such as touch screen (which may be a part of electronic display), or button inputs, for activating or deactivating one or more autonomous driving modes and for enabling a driver or passenger to provide information, such as a navigation destination, to the autonomous driving computer. The autonomous driving computing system may be capable of communicating with components of the vehicle. The computer may be in communication with the vehicle's central processor and may send and receive information from the various systems of vehicle, for example the braking system, acceleration system, signaling system, and navigation system in order to control the movement, speed, etc. of vehicle. The vehicle's central processor may perform all of the functions of a central processor in a non-autonomous computer. Or, the processor may comprise a single processing device or multiple processing devices operating in parallel. It is possible that the computer may control some or all of these functions of vehicle and thus be fully or partially autonomous.

The vehicle may also include a geographic position component in communication with computer for determining the geographic location of the device. The position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it, which can often be determined with better accuracy than absolute geographical location.

Also, contemplated but not shown in FIG. 1C, is that the vehicle may also include other devices in communication with computer, such as an accelerometer, gyroscope or another direction/speed detection device to determine the direction and speed of the vehicle or changes thereto. An acceleration device may determine its pitch, yaw or roll (or changes thereto) relative to the direction of gravity or a plane perpendicular thereto. The device may also track increases or decreases in speed and the direction of such changes. The computer may control the direction and speed of the vehicle by controlling various components. By way of example, if the vehicle is operating in a completely autonomous driving mode, computer may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Also, contemplated but not shown in FIG. 1C, is that the exterior aspects of the vehicle may include components for detecting objects external to the vehicle such as other vehicles, obstacles in the roadway, traffic signals, signs, trees, etc. The detection system may include lasers, sonar, radar, cameras or any other detection devices which record data which may be processed by computer. For example, if the vehicle is a small passenger vehicle, the car may include a laser mounted on the roof or other convenient location.

The laser may have a range of approximately 500 feet, a forty-degree vertical field of view, and approximately a forty-degree horizontal field of view. Laser may have a range of approximately 200 to 350 feet, a forty-degree vertical field of view, and a 360 degree horizontal field of view. The lasers may provide the vehicle with range and intensity information which the computer may use to identify the location and distance of various objects. Further, the lasers may measure the distance between the vehicle and the object surfaces facing the vehicle by spinning on its axis and changing its pitch. The vehicle may also include various radar detection units, such as those used for adaptive cruise control systems. It is possible, each of these radar detection units may have a range of approximately 700 feet for an approximately 25 degree field of view as well as a range of approximately 160 feet for an approximately 74 degree field of view.

Further still, contemplated but not shown in FIG. 1C, is that cameras may be mounted on the vehicle and possibly mounted at predetermined distances so that a parallax from images of 2 or more cameras may be used to compute the distance to various objects. Also, sensors connected to the computer may include tire pressure sensors, engine temperature sensors, brake heat sensors, break pad status sensors, tire tread sensors, fuel sensors, oil level and quality sensors, air quality sensors (for detecting temperature, humidity, or particulates in the air), door sensors, lights, wipers, etc. Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, data may include detailed map information, e.g., highly detailed maps identifying the shape and elevation of roadways, lane lines, intersections, crosswalks, speed limits, traffic signals, buildings, signs, real time traffic information, vegetation, or other such objects and information. For example, the map information may include explicit speed limit information associated with various roadway segments. The speed limit data may be entered manually or scanned from previously taken images of a speed limit sign using, for example, optical-character recognition.

Figure 2A:
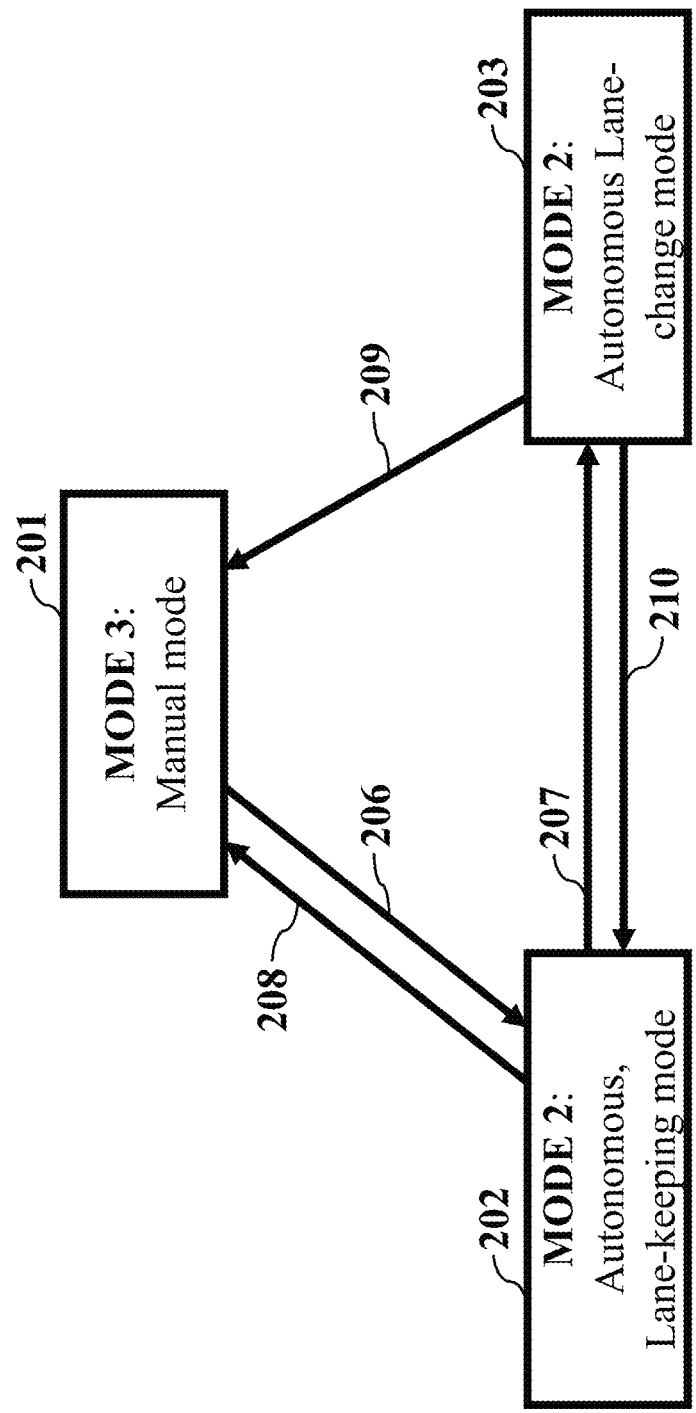
FIG. 2A is a schematic diagram illustrating the switching between the three modes of operation, according to some embodiments of the present disclosure.

FIG. 2A is a schematic illustrating the switching between the three modes of operation. The switch 207 from (MODE 1) autonomous, lane-keeping mode to (MODE 2) autonomous, lane-change mode occurs when the system is in (MODE 1) and it is determined via the vehicle state that the driver has initiated a lane-change. This determination depends on whether the vehicle state is in the safety region corresponding to a lane change switch and if the system penalizes a lane change less than it penalizes lane-keeping. The safety region corresponding to a lane change switch is a set of vehicle states that have been pre-computed so that, if a vehicle achieves one of these states, then a switch to (MODE 2) and a completion of the lane change will be safe and smooth, as determined by the designer. The penalties on lane changes and lane-keeping are determined by the designer.

The switch 208 from (MODE 1) autonomous, lane-keeping mode to (MODE 3) manual mode occurs when the system is in (MODE 1) and it is determined via the vehicle state that the driver has left the lane-keeping safety region and that the driver is not performing the switch 207 to (MODE 2) autonomous, lane-keeping. The safety region corresponding a lane-keeping is a set of vehicle states that have been pre-computed so that, if a vehicle achieves one of these states, then vehicle lane-keeping will be safe and smooth, as determined by the designer.

The switch 206 from (MODE 3) manual mode to (MODE 1) autonomous, lane-keeping mode occurs when the system is in (MODE 3) and it is determined via the vehicle state that the driver has initiated lane-keeping. This determination depends on whether the vehicle state is in the safety region corresponding to a lane-keeping switch. The safety region corresponding to a lane-keeping switch is a set of vehicle states that have been pre-computed so that, if a vehicle achieves one of these states, then a switch to (MODE 1) and a initiation of lane-keeping will be safe and smooth, as determined by the designer. By necessity, this safety region must be smaller than the safety region corresponding to the switch 208 because it must be more difficult to initiate lane-keeping than to resume a lane-keeping.

The switch 209 from (MODE 2) autonomous, lane-change mode to (MODE 3) manual mode occurs when the system is in (MODE 2) and it is determined via the vehicle state that the driver has left the lane-change safety region. The safety region corresponding a lane change is a set of vehicle states that have been pre-computed so that, if a vehicle achieves one of these states, then a lane change will continue to be safe and smooth, as determined by the designer. By necessity, this safety region must be larger than the safety region corresponding to the switch 207 because it must be more difficult to initiate a lane change than to resume a lane change.

The switch 210 from (MODE 2) autonomous, lane-change mode to (MODE 1) autonomous, lane-keeping mode occurs when a lane change has been completed.

Figure 2B:
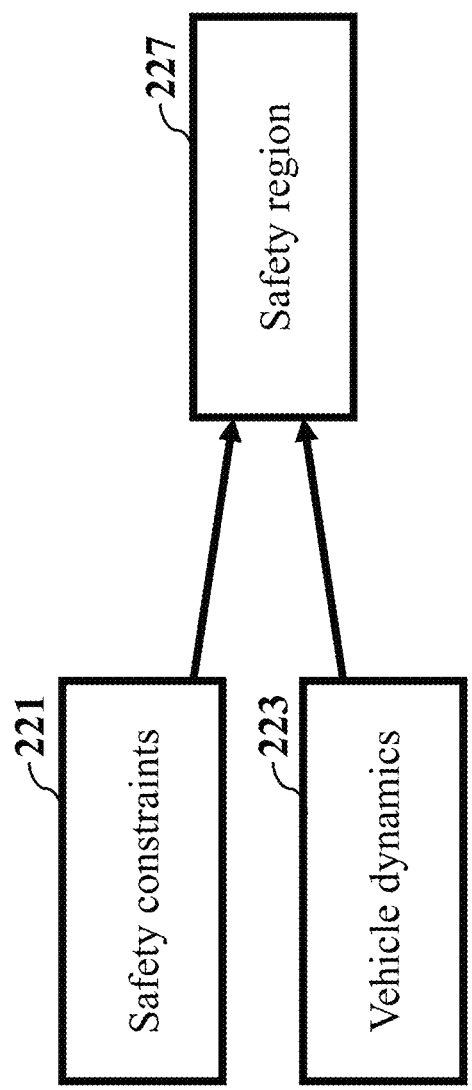
FIG. 2B is a schematic diagram illustrating the components used in determination of the safety region, according to some embodiments of the present disclosure.

FIG. 2B is a schematic illustrating the components used in determination of the safety region. Every safety region 227 is computed algorithmically by programmatically using safety constraints 221 and a model of the closed-loop vehicle dynamics 223, both provided by the designer, to compute a set of states that will ensure safety constraint enforcement for all present and future time. The model of the closed-loop vehicle dynamics is determined using the physical behavior of the vehicle and a control scheme for actuating the vehicle. The safety region is then populated with the states that, under the dynamics of the closed-loop vehicle model, will ensure that safety constraints are enforced for all present and future time. The algorithmic procedure that achieves this is the computational procedure used to determine maximal admissible sets.

Figure 2C:
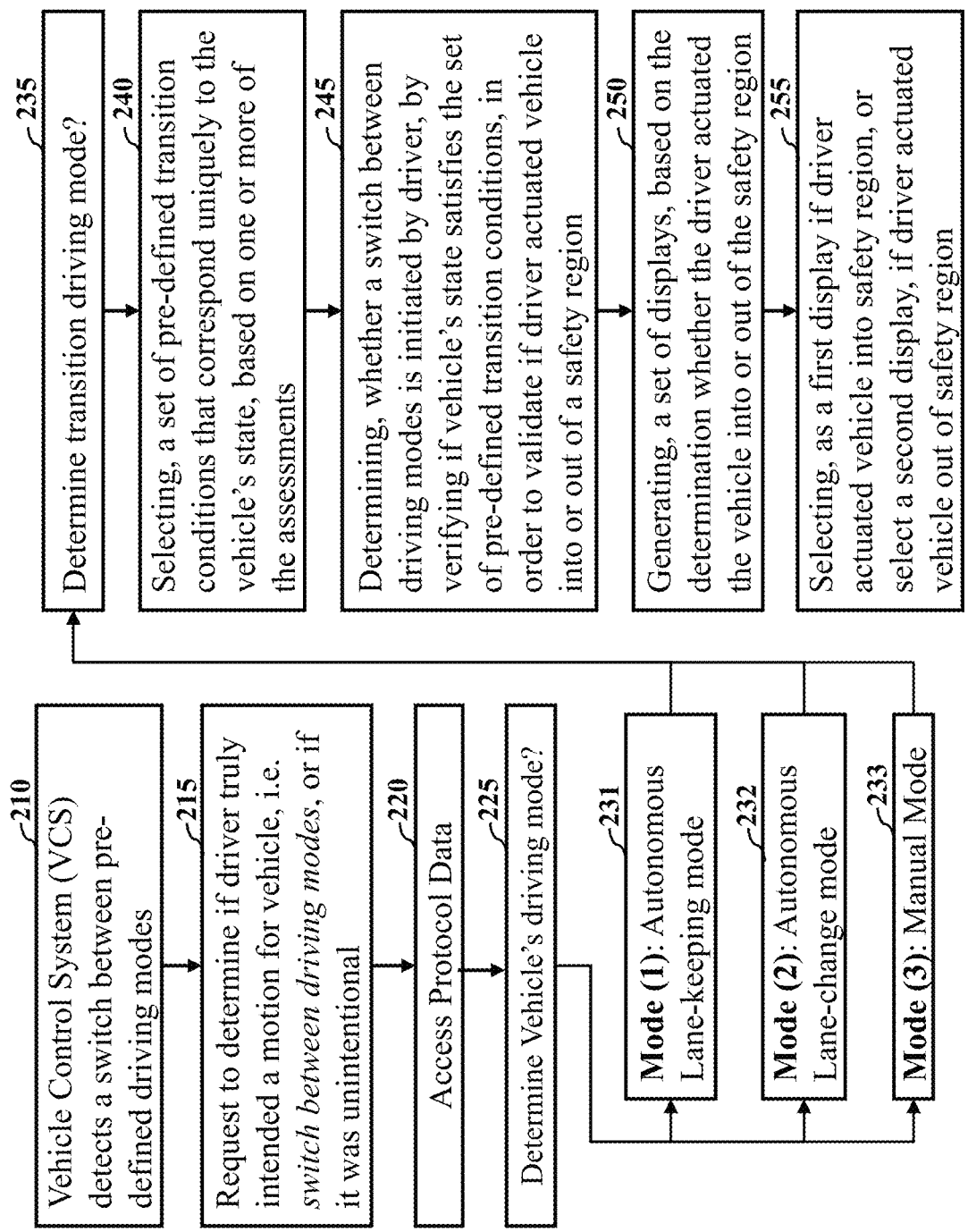
FIG. 2C is a flow diagram illustrating a method according to the aspects of FIG. 2A and FIG. 2B, according to some embodiments of the present disclosure.

FIG. 2C is a flow diagram illustrating a method according to the aspects of FIG. 2A and FIG. 2B, according to some embodiments of the present disclosure.

Step 210 of FIG. 2C includes a vehicle control system (VCS) of the systems of the vehicle that detects a switch between pre-defined driving modes.

Step 215 of FIG. 2C includes the VCS making a request to determine if driver truly intended a motion for vehicle, i.e. switch between driving modes, or if it was unintentional, wherein the driving modes include an autonomous lane keeping mode, an autonomous lane change mode and a manual mode.

Step 220 of FIG. 2C includes using the VCS that is configured to, in response to receiving the transition indication, using, protocol data to assess (i) a status of the vehicle's environment, (ii) a vehicle state of the vehicle, and (iii) systems of the vehicle.

Step 225 of FIG. 2C includes determining the driving modes transitioning from, which can include an autonomous lane keeping mode 231, an autonomous lane change mode 232 or a manual driving mode 233.

Step 235 of FIG. 2C includes determining the driving modes transitioning too?

Step 240 of FIG. 2C includes selecting, a set of pre-defined transition conditions from a plurality of pre-defined transition conditions that correspond uniquely to the vehicle's state, based on one or more of the assessments.

Step 245 of FIG. 2C includes determining, whether a switch between driving modes has been initiated by the driver, by verifying if the vehicle's state satisfies the set of pre-defined transition conditions, in order to validate if the driver actuated the vehicle into or out of a safety region.

Step 250 of FIG. 2C includes generating, a set of displays, based on the determination whether the driver actuated the vehicle into or out of the safety region.

Step 255 of FIG. 2C includes selecting, as a first display of the set of displays based on a priority of the displays, if the driver actuated the vehicle into the safety region, or selecting a second display, if the driver actuated the vehicle out of the safety region. Wherein the VCS can display either the first display or the second display to the driver, that results in either confirming the transition indication or initiating switching the vehicle from a manual driving mode to an autonomous driving mode.

Figure 3:
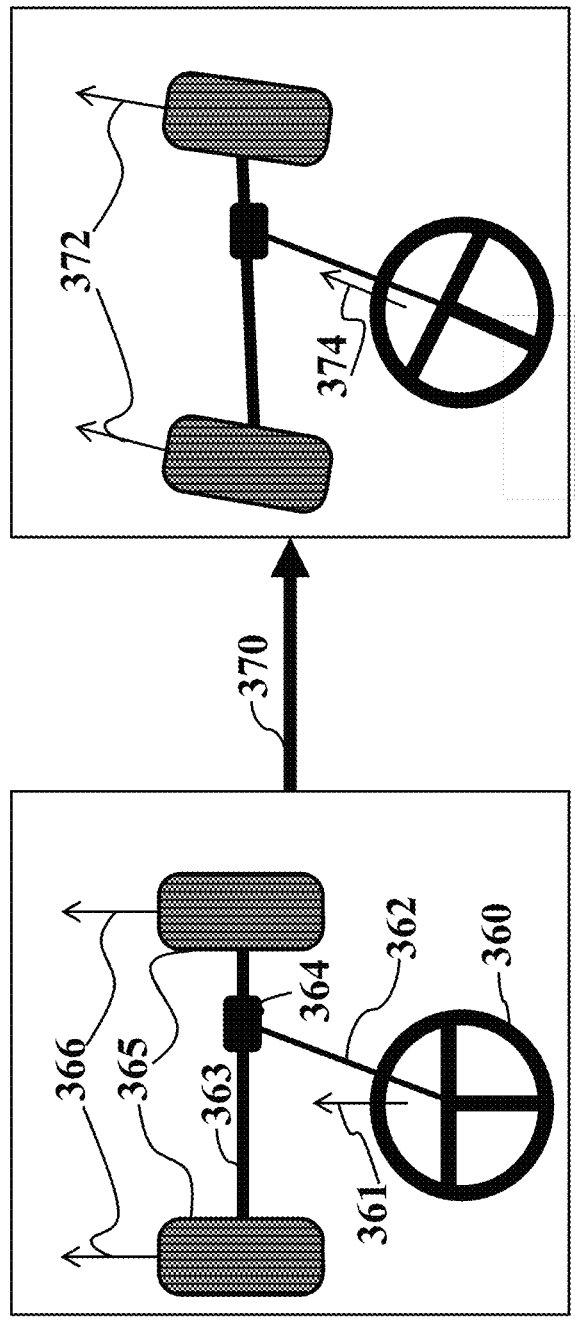
FIG. 3 a schematic of a physical steering system, according to embodiments of the present disclosure.

FIG. 3 is a schematic of a physical steering system, according to embodiments of the present disclosure. The physical steering system can include the driver actuating a steering wheel 360 to a certain direction 361. The steering wheel can be connected to the wheels via a steering column 362, in which case the driver actuates the vehicle wheels. A rack motor 364 actuates the steering column 362 and shaft 363 connecting the vehicle wheels 365. The rack motor actuates the steering wheel to change the direction 372 of the vehicle wheels. At the same time, the direction 374 of the steering is changed, since the steering wheel shaft is actuated so that the direction of the wheels corresponds to the direction of the steering wheel.

From experimentation knowledge gained is that a method can be designed for autonomously operated vehicles that can include steering control systems. The steering control system can include a desired heading that is passed to a tracking controller, which passes a signal to an Electronic Power Steering (EPS) motor to ensure tracking of the desired heading. Further, a reference governor-type approach can be used in the case of autonomous operation, since autonomous operation tracks a desired reference signal. Specifically, the reference governor, can be an add-on scheme applied to tracking controllers solely as a constraint-enforcement scheme, which determines a reference input for the tracking controller that can be deemed to be constraint admissible.

Also gained from experimentation is that a method can be designed for manually operated vehicles that have steering control systems. For example, the steering control system can measure the torque at the steering wheel, which can be amplified using an amplifier, which passes a signal to the EPS motor in order to provide helping torque to the driver. Further, a Model Predictive Control (MPC)-type approach is more appropriate for use in the case of manual operation, since manual operation directly determines an actuator signal and MPC is designed to directly manipulate actuator signals.

However, we learned from the above experiments is that steering control systems both can be fundamentally different. For example, when we compared the two experimental steering control systems to the embodiments of the present disclosure, we realized at least one problem, among many problems. That is, both of the experimented constraint-enforcement approaches are much more computationally heavier or computationally costlier, in that they require more computational resources than the controller that does not consider constraints. This means that using both of the experimented constraint-enforcement approaches in parallel would be undesirable compared to just using one type of constraint enforcement mechanism, as according to the present disclosure. According to the present disclosure, we provide a method to allow the reference governor to be used in both autonomous and manual modes of operation. For example, the constraint-enforcement scheme can include a method, wherein the scheme itself can be called a reference governor, which is a constraint-enforcement scheme, designed to be added on to feedback controllers that have been designed without taking constraints into account.

Some embodiments of the present disclosure introduce a shared-control architecture that allows cooperation between a driver and vehicle. A point of novelty is that all transitions are achieved via manual control of the vehicle using the steering wheel. Specifically, the driver achieves transition between modes by actuating the vehicle into the appropriate state that results in a transition between modes. Because the steering wheel is always attached to the rack, the driver is always able to control the vehicle; as such, the switch between modes is relatively quick and smooth.

The present disclosure includes some embodiments including one of three modes: manual, lane-keeping, and lane-change. Specifically, transitions between modes are activated by satisfying transition conditions that are based on membership of constraint-admissible sets. The constraints characterizing these admissible sets are designed to test whether the vehicle state can safely and appropriately initiate a transition to a particular mode. In the case of the manual-to-lane-keeping transition, the test is whether the vehicle is close enough to the center of the lane and moving slowly enough laterally to safely engage autonomous tracking. In the case of the lane-keeping-to-lane change transition, the test is whether it is more costly, based on some prescribed cost function, to change lane or track the current lane and whether this can be done smoothly. In the case of the autonomous-to-manual transition, i.e., driver takeover, the test is whether the vehicle state has left a prescribed region in which constraints associated with smooth control will no longer be enforceable. In a sense, manual driving is treated as an error state.

A main construction used in the present disclosure is called the maximal admissible set. By definition, maximal admissible sets are the set of all initial states such that a closed-loop control system will enforce a set of prescribed output constraints for all present and future time. These sets are useful because they can be precomputed based on a given set of output constraints and closed-loop dynamics. In the present disclosure, we use them to test whether our closed-loop controller will enforce operational constraints. We compute different sets to correspond to different transitions and determine whether the transition has been activated by testing the set-membership of the state in each admissible set. Using constraint sets is considered for shared control, where control techniques are designed to enforce a set of prescribed constraints.

Maximal Admissible Sets

In regard to considering the closed-loop discrete-time system, $$x(t+1)=Ax(t) \tag{1a}$$

$$y(t)=Cx(t)\in Y \tag{1b}$$

where $x(t)\in R^n$ is the system state, y(t) is the constrained output and $Y\subset R^p$ is the set of output constraints which is assumed to satisfy the Minkowski assumptions, i.e., it is compact, convex, and contains 0 in its interior. Since the system is closed-loop, the matrix A is assumed asymptotically stable.

An (output-constrained) admissible set is a set of initial conditions for the state x(t) with the property that the output y(t) is guaranteed to remain within a set of constraints for all present and future time $Z_+$. The maximal admissible set is the set of all such states, or the union of all admissible sets. It is denoted by, $$O_\infty:=\{x_0:x(0)=x_0,y(t)\in Y,\forall t\in Z_+\} \tag{2}$$

The maximal admissible set $O_\infty$ has a few useful properties. Firstly, if the constraint set Y satisfies the Minkowski assumptions, so does $O_\infty$. Secondly, assuming that $0 \in Y$ and considering a scalar $\alpha > 0$, scaling $Y$ to $\alpha Y$ scales the maximal admissible set from $O_\infty$ to $\alpha O_\infty$. Furthermore, $O_\infty$ is finitely determined, i.e., it can be computed in a finite number of steps. The computation is done recursively according to the following algorithm, $$O_{t+1} := O_t \cap X_t \quad (3)$$

where $O_0 := \mathbb{R}^n$ and $X_t := \{x_0 : CA^t x_0 \in Y\}$. The algorithm terminates at the first instance $t^*$ in which $O_{t+1}^* = O_t^*$ and $O_\infty$ is set to $O_t^*$. Such a time is guaranteed to exist because, due to the asymptotic stability of $A$ and the fact that $Y$ contains 0 in its interior, it is always true that there exists $k \in \mathbb{Z}_+$ such that $X_k \supset \cap_{t=0}^{k'} X_t = O_{k'}$ for some $k' < k$.

Another important property is that, when $Y$ is a polytope, so is $O_\infty$. This can be seen by the fact that, when $Y$ is a polytope, $O_\infty$ is computed in (3) as a combination of linear constraints, meaning that $O_\infty$ is a polytope because it is compact. Therefore, it can be expressed as, $$O_\infty = \{x : Hx \leq h\} \quad (4)$$

where $H$ and $h$ are an appropriately sized matrix and vector, respectively.

Autonomous Controller

In regard to the lane-keeping controller of the present disclosure, several aspects are discussed in further detail including the (A) vehicle dynamics, (B) steering system dynamics, (C) lane-keeping assistance and (D) autonomous lane-change.

A. Vehicle Dynamics

The vehicle model we use is the single-track error-tracking model taken from [10] for a constant longitudinal speed $v_x$, which is given by, $$\begin{bmatrix} \dot{e}_y \\ \ddot{e}_y \\ \dot{e}_\psi \\ \ddot{e}_\psi \end{bmatrix} = A_e \begin{bmatrix} e_y \\ \dot{e}_y \\ e_\psi \\ \dot{e}_\psi \end{bmatrix} + B_\delta \delta + B_\psi \dot{\psi}_d, \quad (5)$$

where $e_y$ is the lateral displacement of the vehicle position from the reference path, $e_\psi$ the difference between actual and desired vehicle yaw angles, $\delta$ is the front wheel angle, and $\dot{\psi}^*_d$ is the desired vehicle yaw rate. The system matrices are given by, $$A_e = \begin{bmatrix} 0 & 1 & 0 & 0 \\ 0 & -\frac{2C_0}{mv_x} & \frac{2C_0}{m} & -\frac{2C_1}{mv_x} \\ 0 & 0 & 0 & 1 \\ 0 & -\frac{2C_1}{I_z v_x} & \frac{2C_1}{I_z} & -\frac{2C_2}{I_z v_x} \end{bmatrix},$$

$$B_\delta = \begin{bmatrix} 0 \\ \frac{2C_{\alpha,f}}{m} \\ 0 \\ \frac{2\ell_f C_{\alpha,f}}{I_z} \end{bmatrix}, B_\psi = \begin{bmatrix} 0 \\ -\frac{2C_1}{mv_x} - v_x \\ 0 \\ -\frac{2C_2}{I_z v_x} \end{bmatrix},$$

With coefficients, $$C_0 = C_{\alpha,f} + C_{\alpha,r},$$

$$C_1 = \ell_f C_{\alpha,f} - \ell_r C_{\alpha,r},$$

$$C_2 = \ell_f^2 C_{\alpha,f} + \ell_r^2 C_{\alpha,r},$$

with relevant system parameters described in Table I, i.e. Table 1 illustrates the vehicle dynamics parameters. See Table 1 below.

| symbols | descriptions (resp.) |
| --- | --- |
| $v_x$ | longitudinal vehicle speed |
| $m$, $I_z$ | vehicle mass and moment of inertia about vertical axis |
| $C_{\alpha,f}$, $C_{\alpha,r}$ | front and rear tire stiffness |
| $\ell_f$, $\ell_r$ | distance from vehicle e.g. to front and rear axles |

B. Steering System Dynamics

In regard to a steer-by-wire steering system. The steering wheel dynamics are given by, $$J_h \ddot{\theta}_h = -C_h \dot{\theta}_h + T_d - T_{ff} \quad (6a)$$

and the dynamics of the rack and pinion assembly are given by, $$Jp\ddot{\theta}_p = -Cp\dot{\theta}_p + T_e + T_m - T_a \quad (6b)$$

where $\theta_h$ and $\theta_p$ are the steering and pinion angles, respectively. The input variables are the driver input torque $T_d$, the force-feedback torque $T_{ff}$, the EPS motor torque $T_e$, the estimated driver input torque $T_m$, and the road alignment torque $T_a$. The estimated input torque $T_m$ approximates the driver input torque $T_d$ and is determined according to, $$T_m = K_s(\theta_h - \theta_p) + C_s(\dot{\theta}_h - \dot{\theta}_p) \quad (7)$$

The force feedback torque $T_{ff}$ is determined so as to give the driver a feeling of the torques resisting his input. It is determined by passing through a PD filter the torques being applied to the pinion shaft, excluding the driver torque, $$T_{ff}(s) = (k_{p,ff} + k_{d,ff} s)(T_e)(s) - T_a(s)) \quad (8)$$

where $k_{p,ff}$ and $k_{d,ff}$ are the proportional and derivative parameters in the PD filter and are determined to give accurate feeling of the road, while minimizing oscillations in the steering wheel. The parameters of the system are described in Table II, i.e. Table II show the steering system dynamics parameters.

C. Lane-Keeping Assistance

To assist the driver in following the center lane, the goal of the controller is to determine $T_e$ so that the lateral error $e_y$ goes to 0 when the driver input torque $T_d$ is held at zero. To do this we consider the coupled vehicle and steering system dynamics, which are related to each other via a constant gear ratio $G_r$ between the road wheel angle $\delta$ and the pinion angle $\theta_p$, $$\delta = G_r \theta_p \quad (9)$$

and the alignment torque. The alignment torque $T_a$ can be approximated in the linear region by, $$T_a \approx T_a - 2C_a(\delta - \theta_{v,f}) \quad (10)$$

where the coefficient $C_a$ is an experimentally determined parameter and $\theta_{v,f}$ is the front-tire velocity angle which, according to small-angle approximation, is given by, $$\theta_{v,f} \approx \frac{\dot{y} + \ell_f \dot{\psi}}{v_x} = \frac{\dot{e}_y - v_x e_\psi + \ell_f \dot{e}_\psi + \ell_f \dot{\psi}_d}{v_x}.$$

Taking the above into account, and assuming that $T_d = T_m = 0$, the coupled dynamics are given by, $$\dot{x} = Ax + BT_e + B_d \dot{\psi}_d \quad (11)$$

where, $A = \begin{bmatrix} 0 & 1 & 0 & 0 & 0 & 0 \\ 0 & -\frac{2C_0}{mv_x} & \frac{2C_0}{m} & -\frac{2C_1}{mv_x} & \frac{2C_{\alpha,f}G_r}{m} & 0 \\ 0 & 0 & 0 & 1 & 0 & 0 \\ 0 & -\frac{2C_1}{I_z v_x} & \frac{2C_1}{I_x} & -\frac{2C_2}{I_z v_x} & \frac{2\ell_f C_{\alpha,f} G_r}{I_x} & 0 \\ 0 & 0 & 0 & 0 & 0 & 1 \\ 0 & \frac{2C_\alpha}{J_p v_x} & -\frac{2C_\alpha}{J_p} & \frac{2C_\alpha \ell_f}{J_p v_x} & -\frac{2C_\alpha G_r}{J_p} & -\frac{C_p}{J_p} \end{bmatrix}$ $B = \begin{bmatrix} 0 \\ 0 \\ 0 \\ 0 \\ 0 \\ \frac{1}{J_p} \end{bmatrix},$ $B_d = \begin{bmatrix} 0 \\ -\frac{2C_1}{mv_x} - v_x \\ 0 \\ -\frac{2C_2}{I_z v_x} \\ 0 \\ \frac{2C_\alpha \ell_f}{J_p v_x} \end{bmatrix},$ $x = \begin{bmatrix} e_y \\ \dot{e}_y \\ e_\psi \\ \dot{e}_\psi \\ \theta_p \\ \dot{\theta}_p \end{bmatrix}$ It is assumed that all states in (11) are measured. Since the measurements are taken from a nonlinear model, a Kalman filter is utilized to estimate the values of the state vector x. The state estimate x̂ is passed through a feedback gain K, which minimizes an LQR cost function with Q and R matrices given by, $Q = \text{diag}(100, 1000, 10, 1, 0.01, 0.01), R = 10,$ and set $T_e := -Kx̂ \quad (12)$

D. Autonomous Lane-Change

The lane-change controller is designed to use the same feedback gain as in the case of lane-keeping. The difference is that, instead of stabilizing to the origin x=0, the system must track a desired reference $\ell$. The lane-change maneuver is done on a straight road and so the desired yaw error $e_\psi$ is held constant at 0. The lateral position on the road $e_y$ tracks the reference $\ell$, so that $\ell = \pm L$, where L>0 is equal to the lane width, and the sign of ± corresponds to left- or right lane changes from the nominal lane, respectively.

Lane-Change Reference Trajectory: We design the lane-change trajectory similarly to [12], minimizing the total jerk, $$\min_{|J(t)| \leq J} \int_0^T |J(t)| dt, \quad (13)$$

with the dynamic constraint $$\frac{d^3 \ell}{dt^3} = J$$

and end-point constraints $\ell(0) = \dot{\ell}(0) = \ddot{\ell}(T) = \ddot{\ell}(0) = \ddot{\ell}(T) = 0$ and $\ell(T) = L$. The Hamiltonian corresponding to the problem is given by, $$H = |j| + p_1 \dot{\ell} + p_2 \ddot{\ell} + p_3 j \quad (14)$$

According to the Pontryagin Minimum Principle [13], $j = -\text{sgn}(p_3)J$ if $|p_3| > J$, $j = 0$ if $|p_3| < J$, and is undefined otherwise. Furthermore, $p_3(t)$ is a second-order polynomial, meaning that it can switch sign at most twice. Taking into account the endpoint constraint on acceleration, we know that $\int_0^T j(t) dt = \ddot{\ell}(T) = 0$; furthermore, the solution to j(t) must be symmetric about t=T/2 given the endpoint constraint on velocity and the limits on the jerk. Therefore, a general solution to j is given by, $$J(t) = \begin{cases} J & \text{if } t \in [0, \Delta_1), \\ 0 & \text{if } t \in [\Delta_1, \Delta_1 + \Delta_2), \\ -J & \text{if } t \in [\Delta_1 + \Delta_2, 3\Delta_1 + \Delta_2), \\ 0 & \text{if } t \in [3\Delta_1 + \Delta_2, 3\Delta_1 + 2\Delta_2), \\ J & \text{if } t \in [3\Delta_1 + 2\Delta_2, 4\Delta_1 + 2\Delta_2) \end{cases} \quad (15)$$

where $\Delta_1 > 0$ and $\Delta_2 \geq 0$ satisfy $4\Delta_1 + 2\Delta_2 = T$. To obtain the values of $\Delta_1$ and $\Delta_2$, we perform elementary calculus to find the expression for $\ell(T)$, $$\ell(T) = 2J\Delta_1^3 + 3J\Delta_1^2 \Delta_2 + J\Delta_1 \Delta_2^2 \quad (16)$$

Setting $\ell(T) = L$ and using the fact that $4\Delta_1 + 2\Delta_2 = T$, obtains, $$2JT\Delta_1^2 - JT^2 \Delta_1 + 4L = 0 \quad (17)$$

which implies that, $$\Delta_1 = \frac{T - 2\Delta_2}{4}, \quad (18)$$

$$\Delta_2 = \frac{\sqrt{T^2 - 32L/JT}}{2}$$

which completely characterizes the control law (15) and exists as long as $J \geq 32L/T^3$.

2) Tracking Controller: The tracking controller is designed based on the solution to the full-information output regulator problem [14]. We are concerned with perfect tracking of the reference $\ell$ when jerk $\square$ is held constant. In this case, it can be modeled as the output of the following system, $$\dot{w} = Sw, \quad (19a)$$

$$\ell = C_2 w \quad (19b)$$

$$\text{where, } S = \begin{bmatrix} 0 & 1 & 0 & 0 \\ 0 & 0 & 1 & 0 \\ 0 & 0 & 0 & 1 \\ 0 & 0 & 0 & 0 \end{bmatrix}, C_2 = [1 \ 0 \ 0 \ 0].$$

The solution is given by matrices $G \in M_{6,4}$ and $F \in M_{1,4}$ that satisfy the linear equations, $$PS=AP+BF \quad (20a)$$

$$C_1 P=C_2 \quad (20b)$$

where $C_1=[100000]$. To track $\ell$, the control input is set as, $$T_e := -K(x^\wedge - Gw) + Fw \quad (21)$$

where $w:=[\ell \ \dot{\ell} \ \ddot{\ell} \ j]$ and the derivatives of $\ell$ are computed by integrating (15). Note that (21) is consistent with (12) whenever $w=0$; as such, we can use (21) as our control law and choose which lane to track by appropriately modifying $w$.

Transitions Between Modes

Figure 4:
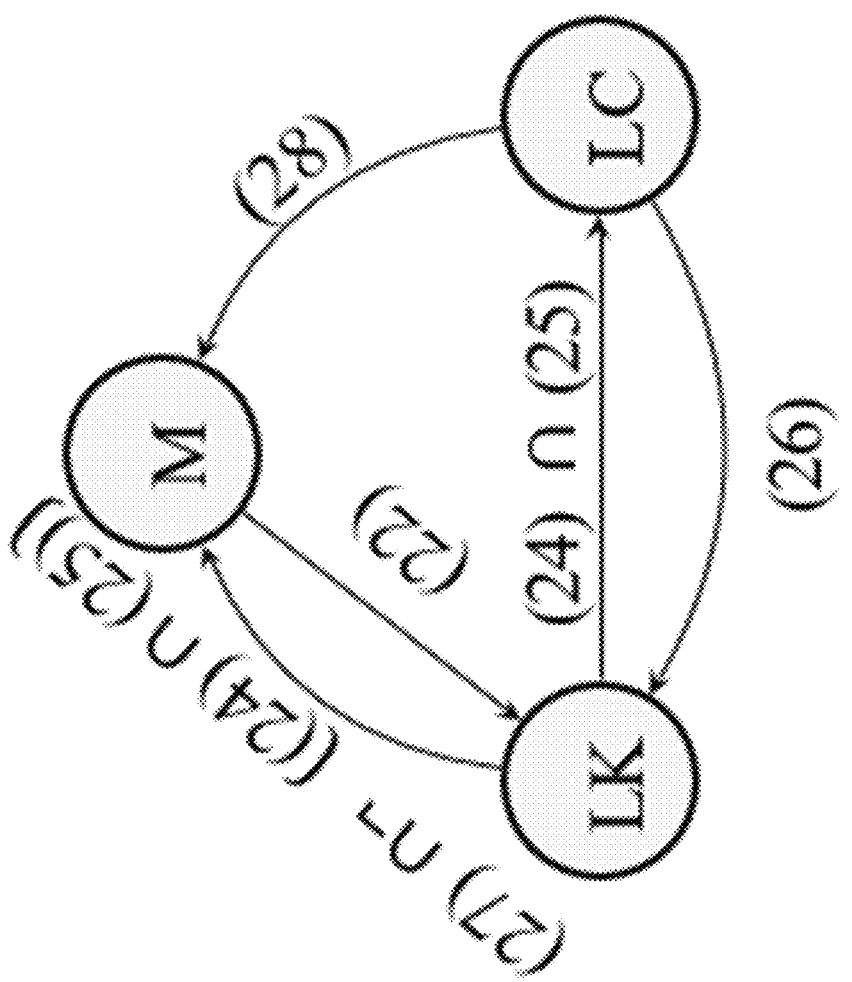
FIG. 4 is a schematic diagram illustrating logic for switching between manual mode (M), lane-keeping (LK), and lane change maneuver (LC), with labels on the nodes showing requirements for transition, according to embodiments of the present disclosure.

FIG. 4 is a schematic diagram illustrating logic for switching between manual mode (M), lane-keeping (LK), and lane change maneuver (LC), with labels on the nodes showing requirements for transition, according to embodiments of the present disclosure.

Some embodiments of the present disclosure include a method of transitioning between manual and autonomous modes and lane-keeping and lane-change modes. The possible transitions are shown in FIG. 4, where a state diagram shows the three modes of operation: manual (M), lane-keeping (LK), and lane change (LC), and the transition logic between the three. In this section, we present explanations of the switching between the modes. In order to provide further details of the method of switching from manual to autonomous mode, then from lane-keeping to lane-changing, and finally from autonomous to manual mode, each aspect is discussed below, including: (A) Autonomous Takeover; (B) Driver-Initiated Autonomous Lane-Change; (C) Driver-Initiated Autonomous Lane-Change; (D) Manual Takeover; and (E) Synthesis.

A. Autonomous Takeover

In switching from manual to autonomous modes, we expect the driver to control the vehicle into a position from which the controller can take over smoothly and safely. A way to characterize this is through the use of constraints. Specifically, we can set a constraint on the state, $$Cx \in Y_{lk},$$

which we expect to be satisfied during the switchover to autonomous mode. Moreover, these constraints ought to be satisfy-able by the autonomous feedback controller (12). The set of all states for which the constraint above can be satisfied is a maximal admissible set, a discrete-time approximation of which we can define by defining $A_K$ as the discrete time closed-loop state transition matrix, a discretization of $A-BK$ with appropriate time constant $T_d$. The maximal admissible set we thus define is given by $O_\infty(Y_{lk})$: $=O_\infty(A_K,C,Y_{lk})$.

The transition therefore occurs when the state estimate $x^\wedge$ is determined to be in the maximal admissible set, i.e., $$x^\wedge \in O_\infty(Y_{lk}) \quad (22)$$

B. Driver-Initiated Autonomous Lane-Change

A quadratic cost function is defined as, $$c(x)=\tfrac{1}{2}x^T Px \quad (23)$$

where P is the solution to the algebraic Riccati equation associated with the LQR problem and therefore (23) is a Lyapunov function for the control (12). To test whether a lane-change has been initiated by the driver, we compare the cost of tracking the center of the lane versus tracking the lane-change trajectory $\ell$, $$c(\hat{x}) > c(\tilde{\hat{x}}) \quad (24)$$

where $\tilde{\hat{x}}:=\hat{x}-G\hat{w}$ and $\hat{w}$ is determined as if a lane change has been initiated by the driver. Specifically, at every update of the control $T_e$, in order to test whether a lane change has been initiated by the driver by comparing the costs (24) where $\hat{w}$ is determined by setting $\ell = e_y$ and back-computing the derivatives $\dot{\ell}$, $\ddot{\ell}$, and j using (15). Since the reference $\ell(t_e)=Jt_e^3/6$ for $t_e \in [0, \Delta_1)$ and $e_y > 0$, it is set $$t_e := \sqrt[3]{6|e_y|/J}$$

and, $$\hat{w}:=\text{sgn}(e_y)[e_y, \tfrac{1}{2}Jt_e^2, Jt_e, J]^T.$$

This method of determining $\hat{w}$, may possible be improved, for example some methods would use all state information x to obtain an estimate of $\hat{w}$, by non-limiting example. Since this is not the focus of some of the goals of the present disclosure, the above mentioned method is being opted.

The cost-comparison test (24) is not sufficient for determining the initiation of a lane change as it does not provide a way to differentiate between manual takeover of initiation of a lane change. To differentiate between the two, we propose a set-membership test, similar to the manual-to-autonomous handover technique presented above. In this case, we define a set of constraints that we expect to satisfy during the transition to the lane change, $$\tilde{x}:=x-Gw \in Y_{lc},$$

and define a maximal admissible set $O_\infty(Y_{lc}):=O_\infty(A_K,C,Y_{lc})$. The set is invariant with respect to the dynamics of $\tilde{x}$, which can be seen by performing the derivation: $\dot{\tilde{x}}=\dot{x}-G\dot{w}=Ax+BT_e-GSw=Ax-BK(x-Gw)+BFw-GSw=A(x-Gw)-BK(x-GW)+(AG+BF-GS)w=(A-BK)(x-GW)=(A-BK)\tilde{x}$. A switch from lane-keeping to a lane change is successful if (24) is satisfied and, $$\tilde{\hat{x}} \in O_\infty(Y_{lc}) \quad (25)$$

Determined is that a lane change has been completed once the reference has converged to the target value, i.e., $$\ell(t)=\ell(T) \quad (26)$$

C. Manual Takeover

In regard to a method of determining whether a driver has taken control of the vehicle. A departure from lane-keeping or lane-change maneuver can be characterized by defining constraints, $$Cx \in \bar{Y}_{lk},$$

$$C\dot{x} \in \bar{Y}_{lc},$$

and defining maximal admissible sets $O_\infty(\bar{Y}_{lk}) := O_\infty(A_K, C, \bar{Y}_{lk})$ and $O_\infty(\bar{Y}_{lc}) := O_\infty(A_K, C, \bar{Y}_{lc})$, respectively. The system determines a manual takeover whenever, $$\hat{x} \notin O_\infty(\bar{Y}_{lk}), \hat{\dot{x}} \notin O_\infty(Y_{lc}) \quad (27)$$

in the case of lane-keeping and, $$\hat{\dot{x}} \notin O_\infty(\bar{Y}_{lc}) \quad (28)$$

in the case of a lane change.

D. Synthesis

In FIG. 4, a state diagram shows the three modes of operation, manual (M), lane-keeping (LK), and lane change (LC), and the transition logic between the three. Note that, since it is possible that (24)∩(25) and (27) could both be simultaneously true, we negotiate any conflict by checking that the former is not true before checking the latter.

Experimental Results for the Driving Simulator

Figure 5:
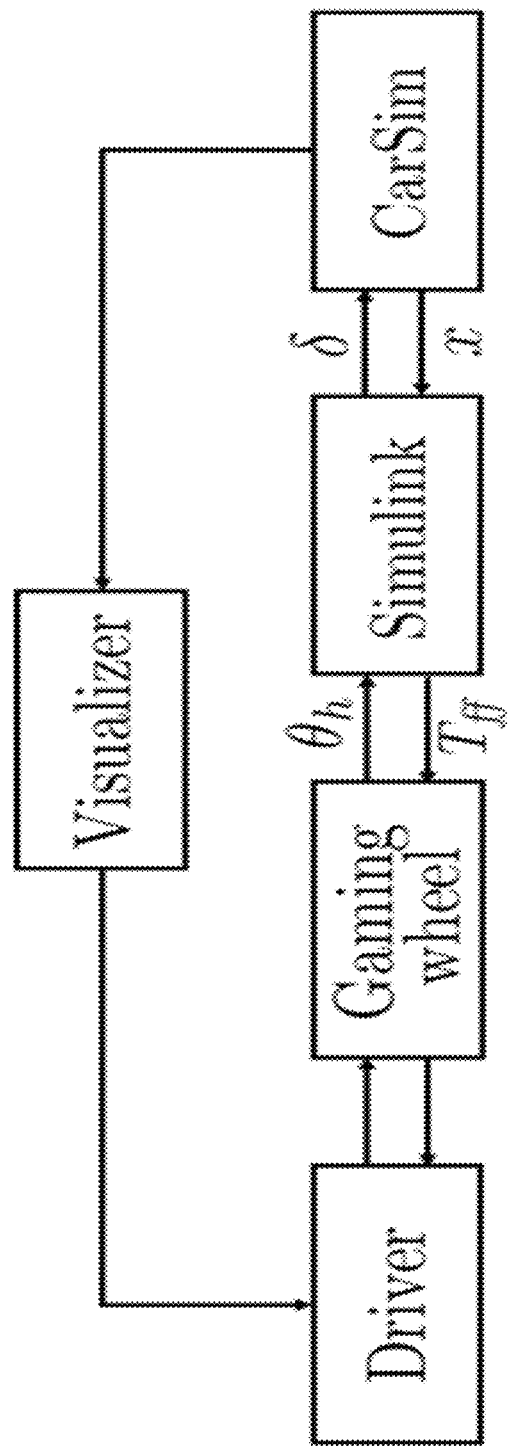
FIG. 5 is a schematic illustrating a driving simulator setup, in order to evaluate a control scheme in the driving simulator, according to embodiments of the present disclosure.

FIG. 5 is a schematic illustrating a driving simulator setup, in order to evaluate a control scheme in the driving simulator, according to embodiments of the present disclosure. The vehicle dynamics are simulated using CarSim 2018.0 and MATLAB Simulink R2015b. The road visualization is provided via the CarSim VS Visualizer and projected onto a computer monitor with 60 Hz refresh rate. The driver actuates the simulated system using a Thrustmaster T300RS gaining wheel, which provides force-feedback. We use the predefined E-Class CarSim vehicle to simulate the vehicle dynamics with a modification of the steering system.

Specifically, we override CarSim's internal steering system model with the one presented in the Autonomous Controller, Steering System Dynamics Section above. This is done so that we can attach the gaining wheel to the system. Simulink passes the force-feedback torque $T_{ff}$ to the gaining wheel and receives the angle of the steering wheel $\theta_h$ from the wheel. The angle $\theta_h$ is differentiated in Simulink to obtain $\dot{\theta}_h$. In Simulink, we propagate the steering dynamics to determine the angle of the road wheel $\delta$, which we pass to CarSim and overwrite the value of $\delta$ in its software. CarSim passes the system state x to the Simulink model, which determines all the other states, estimates, and the control input. We assume a constant speed for the duration of the simulation and therefore set the CarSim internal driver model to track a preset speed, which is held at $v_x = 80$ km/h.

The constraint sets that we use to define the switch-over behavior are given by, $$Y_{lk} := \{(e_y, \dot{e}_y, \theta_p, \dot{\theta}_p) : |e_y| \leq 0.5 \text{ m}, |\dot{e}_y| \leq 0.5 \text{ m/s}, |\theta_p| \leq 5°, |\dot{\theta}_p| \leq 10°/s\},$$

$$\bar{Y}_{lk} := \{(e_y, \dot{e}_y, \theta_p, \dot{\theta}_p) : |e_y| \leq 1 \text{ m}, |\dot{e}_y| \leq 1 \text{ m/s}, |\theta_p| \leq 10°, |\dot{\theta}_p| \leq 20°/s\},$$

and $Y_{lc} := \bar{Y}_{lc} := \bar{Y}_{lk}$. The results of our experiments are presented in FIGS. 3-6. We have performed three experiments in order to test the various transitions between modes.

Figure 6A:
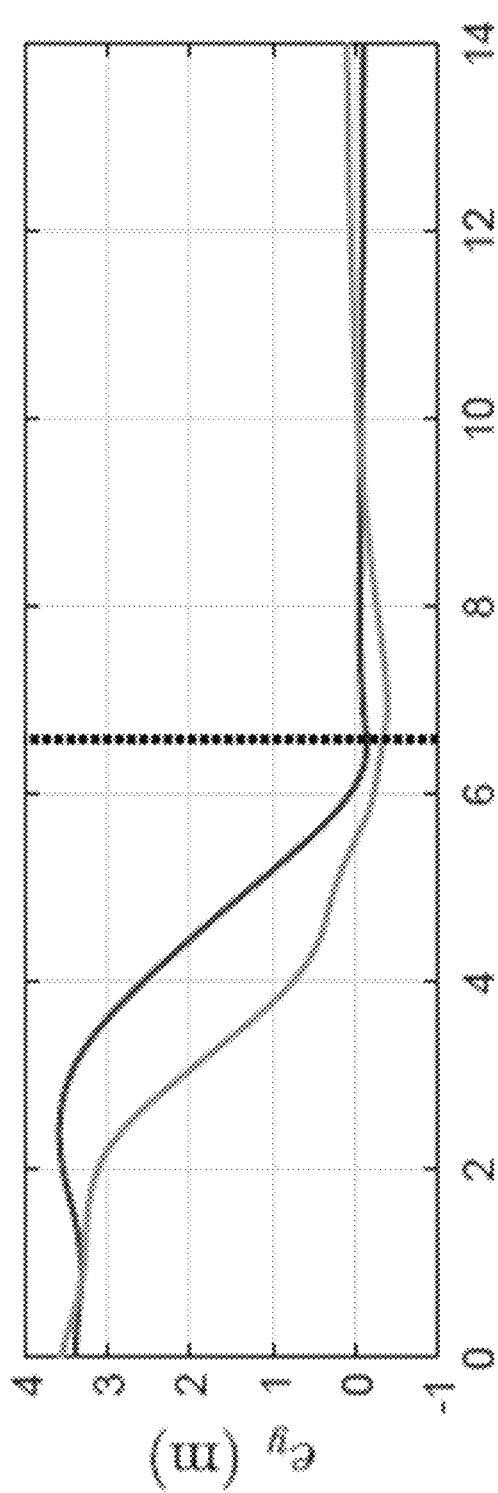
FIGS. 6A, 6B and 6C are graphs illustrating plots corresponding to autonomous takeover for nominal (dark) and alternative (light) control schemes.
Figure 6B:
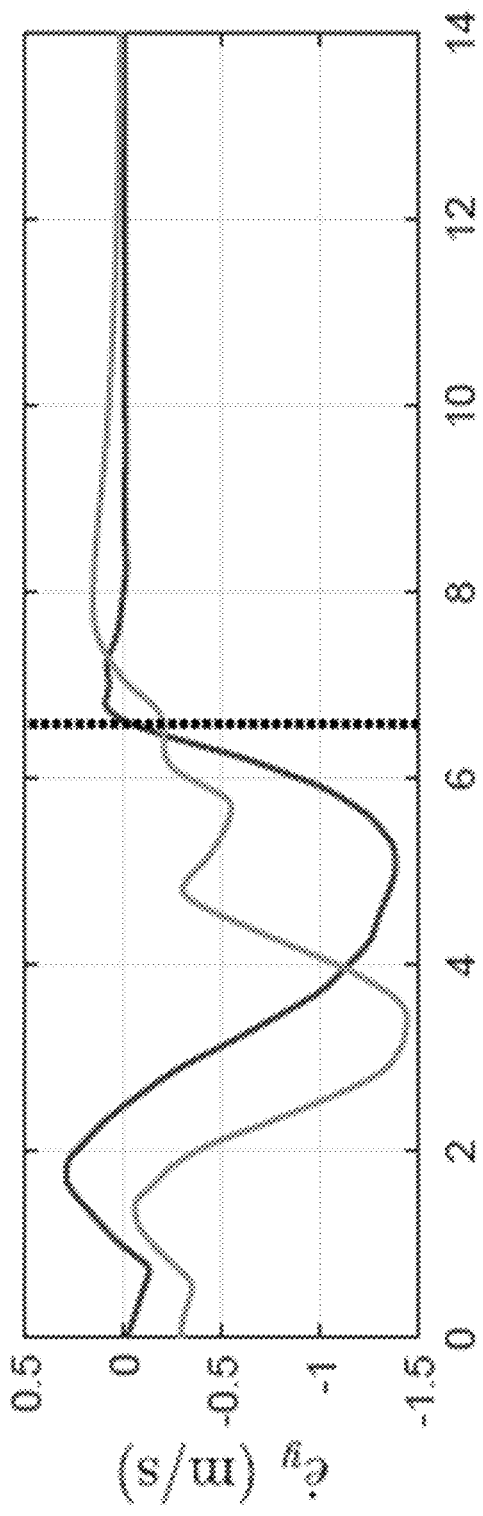
Figure 6C:
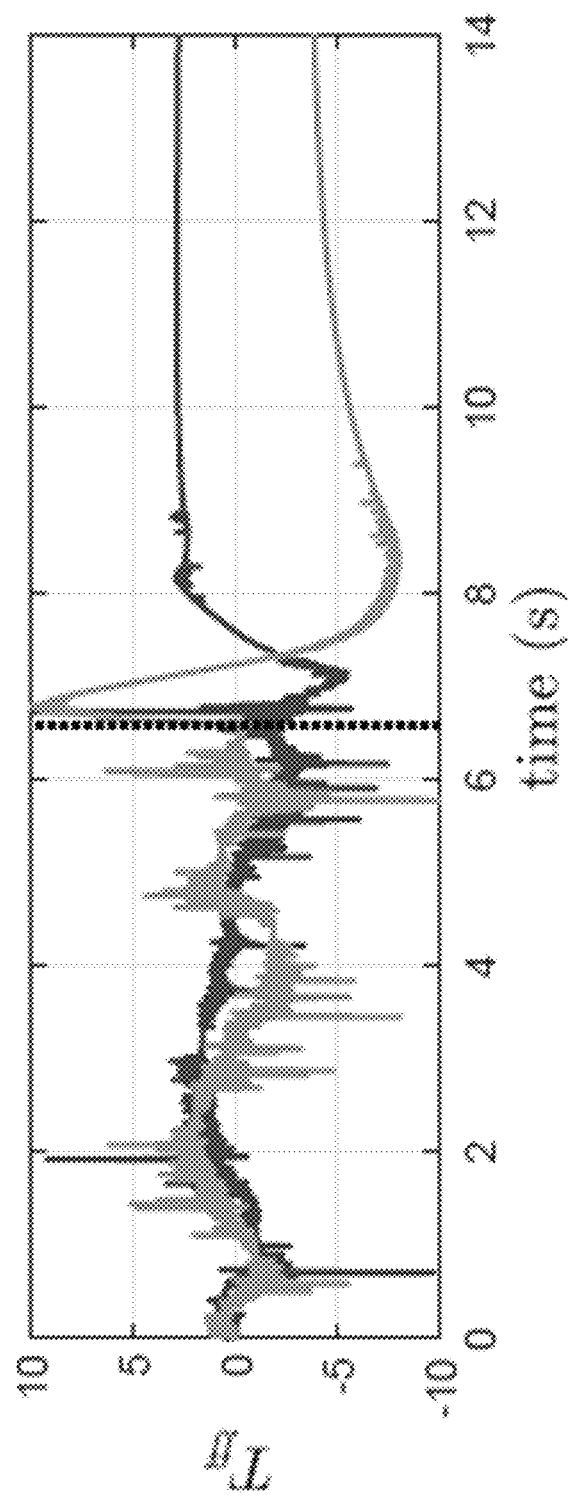

FIGS. 6A, 6B and 6C are graphs illustrating plots corresponding to autonomous takeover for nominal (dark) and alternative (light) control schemes, FIG. 6A illustrates a position from reference lane, FIG. 6B illustrates a relative rate of change of position, and FIG. 6C illustrates dimensionless force feedback command sent to the gaining wheel (±10 are saturation bounds), wherein for FIGS. 6A, 6B and 6C the vertical lines signify a transition to autonomous mode, according to embodiments of the present disclosure. For example, FIGS. 6A, 6B and 6C present results for the autonomous takeover of the Transitions Between Modes, Autonomous Takeover Section, wherein the behavior of the nominal control scheme is compared to an alternative scheme, i.e. such that the use of (22) is replaced to determine if a switch has occurred with the check, $$Cx \in Y_{lk} \quad (29)$$

In both tests, the driver begins by driving in the lane left of the target and steers the vehicle towards the center of the target lane. As can be seen in the plot of the force feedback torque in FIG. 6C, the alternative test (29) does not perform as well. We qualitatively observed during testing that it typically results in twice as much force-feedback to the driver, resulting in a jerky feel upon switchover. This implies that the use of the maximal admissible set can lead to smoother switching when compared to a simpler method.

Figure 7A:
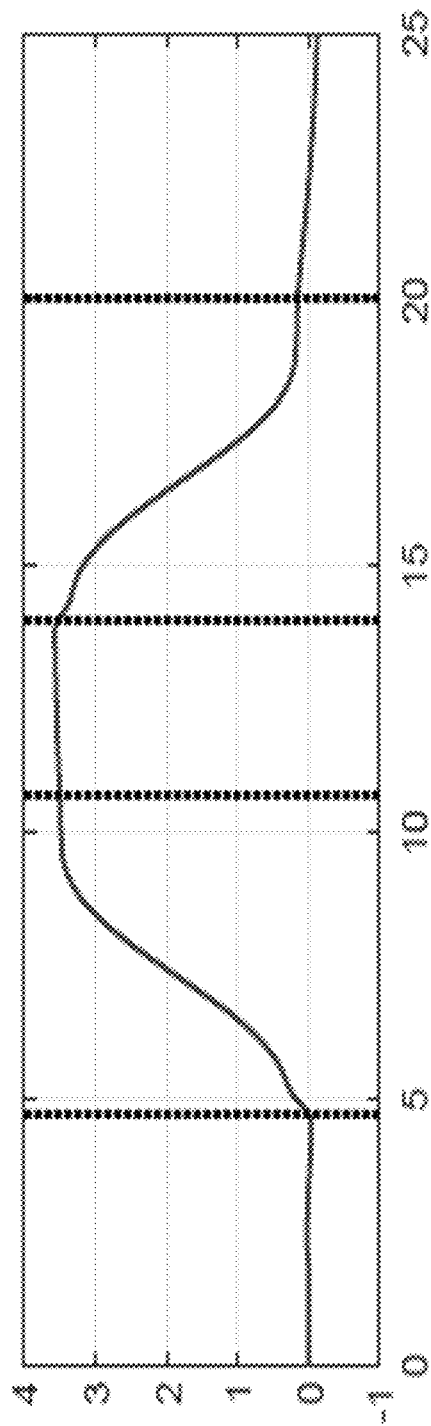
FIGS. 7A & 7B are graphs illustrating plots corresponding to driver-initiated lane changes.
Figure 7B:
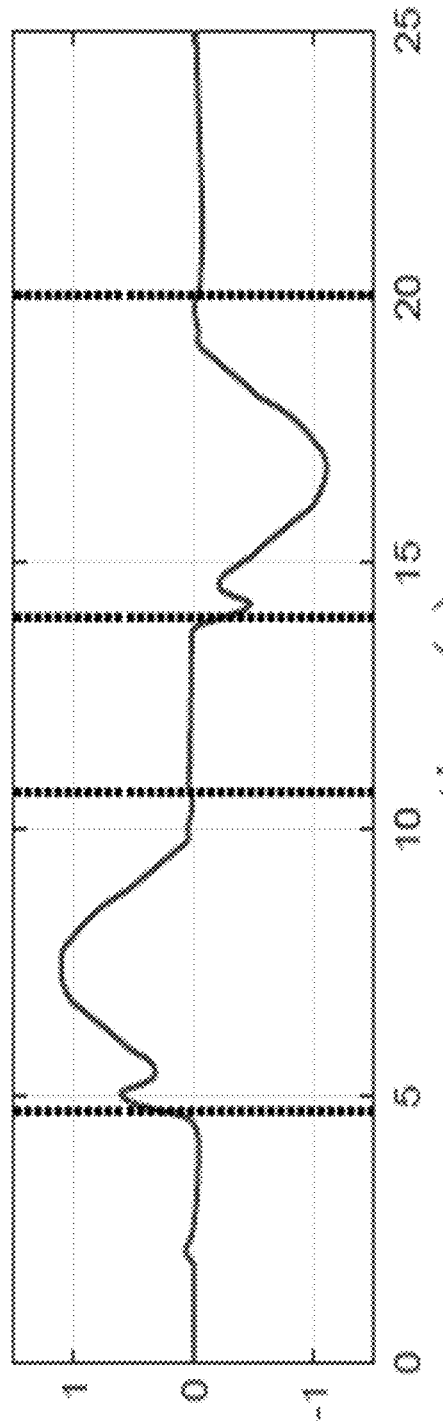

FIGS. 7A & 7B are graphs illustrating plots corresponding to driver-initiated lane changes, FIG. 7A illustrates a position from reference lane and FIG. 7B illustrates a relative rate of change of position, wherein the vertical lines of FIGS. 7A & 7B, signify initiations and completions of lane changes, according to results from experimentation, according to the present disclosure.

Figure 8A:
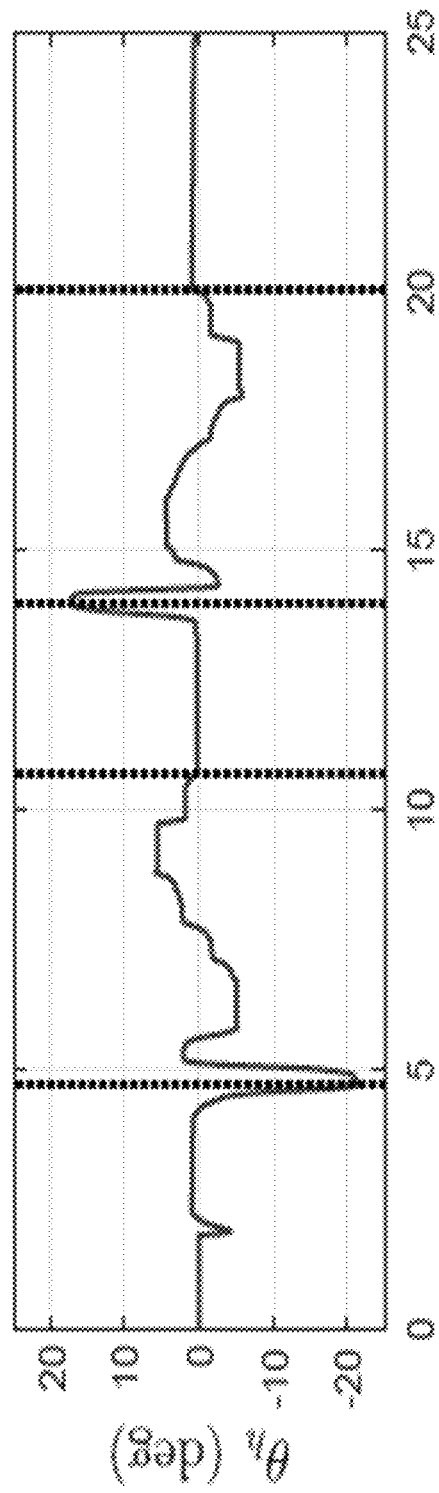
FIGS. 8A & 8B are graphs illustrating plots corresponding to driver-initiated lane changes.
Figure 8B:
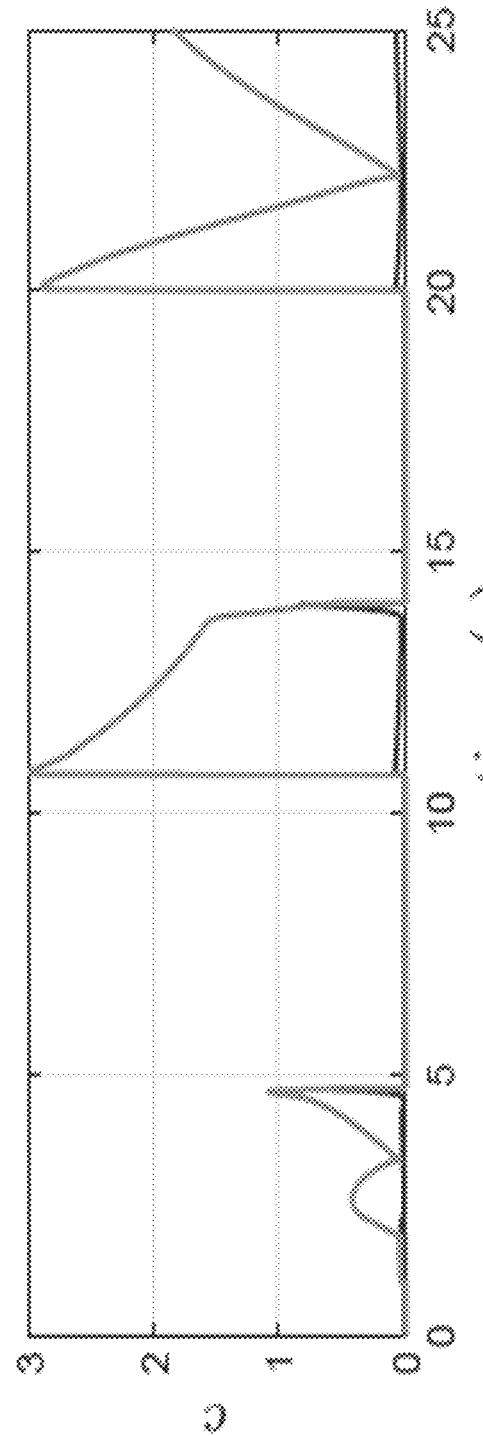

FIGS. 8A & 8B are graphs illustrating plots corresponding to driver-initiated lane changes, FIG. 8A illustrates a steering wheel position and FIG. 8B illustrates a cost of lane-keeping (dark) and cost of lane change (light), wherein the vertical lines of FIGS. 8A & 8B, signify initiations and completions of lane changes, according to results from experimentation, according to the present disclosure.

Regarding FIGS. 7A & 7B and FIGS. 8A & 8B, in a next experiment, the lane-switching performance of the method is tested by initiating a left-lane change followed by a right-lane change. According to the results presented in FIGS. 7A & 7B and FIGS. 8A & 8B, it is noted that the driver is able to initiate a lane change by actuating the vehicle into a state from which the system can take over into a lane change. Further, FIGS. 8A & 8B illustrate that this corresponds to smoothly moving the steering wheel about 20° from the center position, until the system determines that the cost of tracking a lane change is less than the cost of lane-keeping.

Figure 9A:
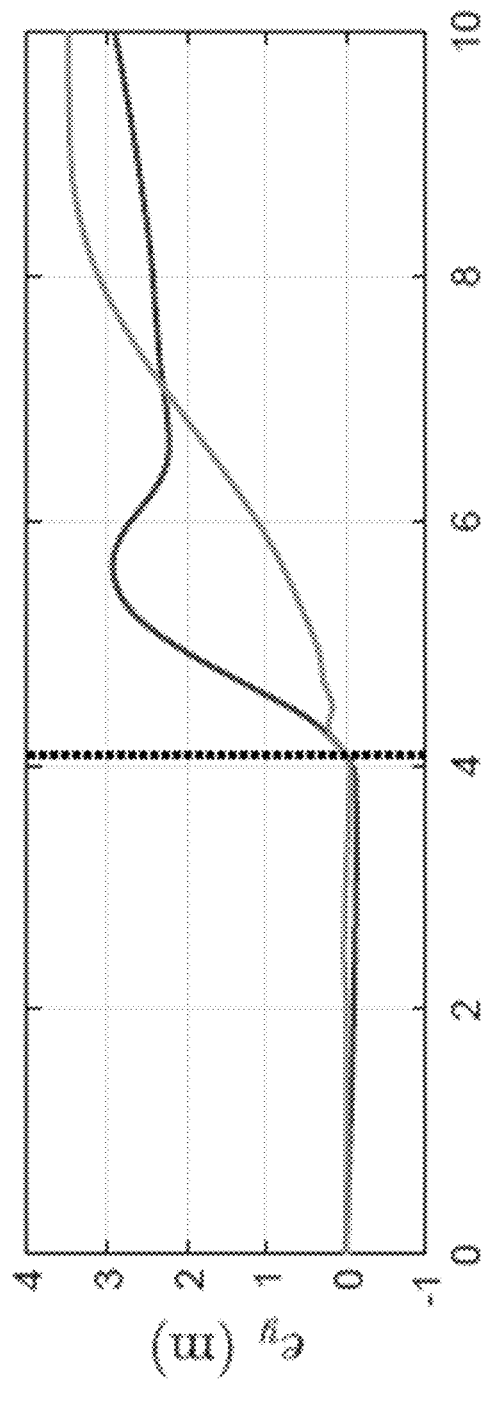
FIGS. 9A & 9B are graphs illustrating plots corresponding to manual takeover for nominal (dark) and alternative (light) control schemes.
Figure 9B:
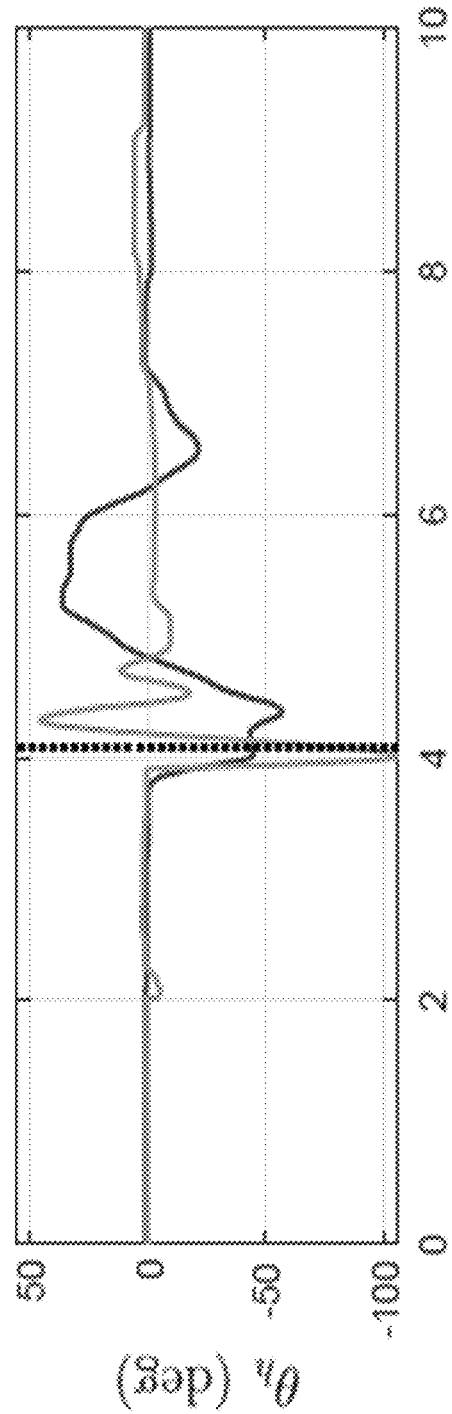

FIGS. 9A & 9B are graphs illustrating plots corresponding to manual takeover for nominal (dark) and alternative (light) control schemes, FIG. 9A illustrates a position from reference lane and FIG. 9B illustrates a steering wheel position, wherein vertical lines of FIGS. 9A & 9B signify a transition to autonomous mode or an initiation of lane change, according to results from experimentation, according to the present disclosure. In regard to FIGS. 9A & 9B, a final experiment included two tests performed in which the driver attempts to perform manual takeover.

In a first test, the nominal control scheme is used and, in a second test, the LK→LC test (24)∩(25) is replaced with just (24) and the LK→M test (27)∩¬((24)∩(25)) with just (27). Effectively, this ignores checking whether the lane change has entered the constraint-admissible region of attraction of the lane-tracking controller. As expected, when the check for (25) is turned off, the controller interprets much larger forces from the driver as a request for a lane change, instead of recognizing that the driver desires to manually take over. This can be seen in FIGS. 9A & 9B, where the alternative scheme mistakes a large and rapid change in the steering angle for a request for lane change, but the nominal control scheme is able to determine that a smaller, similarly rapid change in the steering angle is a request for a manual takeover.

Based upon experimentation, the method for transitioning between manual and autonomous modes in an automotive vehicle includes three modes. Wherein the three driving modes include autonomous-lane-keeping, autonomous-lane changes and manual mode. The autonomous mode controller was designed to track the center of a lane when lane-keeping or a minimum jerk lane-change trajectory when changing lanes. To determine transitions, we designed a state machine that would transition between modes based on the satisfaction of maximal-admissible set membership criteria. The results of the experiments validated the systems and methods of the present disclosure in showing smooth, safe, and appropriate transitions between modes.

Features

According to another embodiment of the present disclosure, a method method including receiving a transition indication from a processor, to switch a semi-autonomous vehicle from a driving mode to another driving mode while a driver is driving the vehicle on a roadway. Wherein the driving modes include an autonomous lane keeping mode, an autonomous lane change mode and a manual mode. Using the processor that is configured to in response to receiving the transition indication, using, protocol data to assess (i) a status of the vehicle's environment, (ii) a vehicle state of the vehicle, and (iii) systems of the vehicle. Selecting, a set of pre-defined transition conditions from a plurality of pre-defined transition conditions that correspond uniquely to the vehicle's state, based on one or more of the assessments. Determining, whether a switch between driving modes has been initiated by the driver, by verifying if the vehicle's state satisfies the set of pre-defined transition conditions, in order to validate if the driver actuated the vehicle into or out of a safety region. Generating, a set of displays, based on the determination whether the driver actuated the vehicle into or out of the safety region. Selecting, as a first display of the set of displays based on a priority of the displays, if the driver actuated the vehicle into the safety region, or selecting a second display, if the driver actuated the vehicle out of the safety region. Displaying either the first display or the second display to the driver, that results in either confirming the transition indication or initiating switching the vehicle from a manual driving mode to an autonomous driving mode. Wherein the following aspects below are contemplated as configuring a modified embodiment of the above embodiment.

An aspect of the present disclosure includes the transitions between driving modes includes a first transition that is a switch from the manual driving mode to the lane-keeping mode, a second transition is a switch from the lane-keeping mode to the lane-change mode, a third transition is a switch from the lane-keeping mode to the manual driving mode, a fourth transition is a switch from lane-change to manual mode, and a switch from the lane-changing mode back to the lane keeping mode is based on whether a lane change has been completed.

Another aspect of the present disclosure includes the first transition includes a set of pre-defined transition conditions that include whether the vehicle is within a predefined distance range approximate to a center of a lane of the roadway, and that the vehicle is moving at a predefined speed range in lateral direction, so as to safely engage an autonomous tracking module of a system of the vehicle. Wherein when the system of the vehicle is in the manual driving mode, and the processor confirms if the vehicle is actuated into the safety region, then the processor determines that an autonomous take-over has been initiated, such that the safety region is a set of all states that ensures that an autonomous controller of a system of the vehicle can safely take over control and track a center-lane and enforce safety constraints.

Another aspect of the present disclosure includes the second transition can include a set of pre-defined transition conditions that include whether an amount of a cost, based on a predefined cost function, to change a lane or to track a current lane by the vehicle, and whether a cost of tracking a center lane is greater than a cost of tracking a minimal jerk lane-change trajectory based on a predefined cost range. Wherein when the system of the vehicle is in the lane-keeping mode, the processor confirms if the vehicle is actuated into the safety region, upon confirmation, the processor further performs a first additional predefined transition condition to determine if a lane-change has been initiated, such that a second additional predefined transition condition compares an amount of an effort needed to resume lane-keeping versus an amount of effort needed to perform a lane change, and if, in addition to the first additional predefined transition condition, less effort is needed to switch lanes, then, the processor determines that a lane change has been initiated.

Another aspect of the present disclosure includes the third transition includes a set of pre-defined transition conditions that include whether a vehicle state has left a predefined safety region in which pre-defined transition constraints associated with a uniform control of the vehicle is no longer be enforceable by the processor, which the processor then considers the manual driving mode as an error state, or a driver takeover of the vehicle. Wherein the predefined safety region is a set of all vehicle states that ensure that an autonomous controller of the systems of the vehicle will track a center-lane and enforce predefined safety transition constraints, and when the system of the vehicle is in the lane-keeping mode, the processor confirms if a predefined safety transition constraint has been violated, if the predefined safety transition constraint is violated, and simultaneously a lane change has not been initiated, the processor determines that a manual take-over has been initiated.

Another aspect of the present disclosure includes the fourth transition includes a set of pre-defined transition conditions that include whether a vehicle state has left a predefined safety region in which pre-defined transition constraints associated with a uniform control of the vehicle is no longer be enforceable by the processor, which the processor then considers the manual driving mode as an error state, or a driver takeover of the vehicle. Wherein the predefined safety region is a set of all vehicle states that ensure that an autonomous controller of the systems of the vehicle will do a lane change and enforce predefined safety transition constraints, and when the system of the vehicle is in the lane-change mode, the processor confirms if the predefined safety transition constraint has been violated, and upon confirmation, the processor determines that a manual take-over has been initiated.

Another aspect of the present disclosure includes the lane change for the switch from the lane-changing mode back to the lane keeping mode, is determined to be completed when a lane change trajectory converges to a center of a new lane of the roadway.

Another aspect of the present disclosure includes the transitions between driving modes are activated by satisfying predefined transition conditions that are based on membership of admissible sets. Wherein the predefined transition conditions are constraints characterizing these admissible sets and structured to determine whether the vehicle state can safely initiate a transition to a particular mode. Wherein the safety is defined using constraints, which are determined by a designer of a switching system associated with the systems of the vehicle.

Another aspect of the present disclosure includes the driver is capable of achieving all transitions between modes, via manual control of the vehicle, by moving a steering wheel attached to a rack of the vehicle, in order to actuate the vehicle into a vehicle state resulting in a transition between modes.

Another aspect of the present disclosure includes the safety region represents a set of vehicle states from which the vehicle is to operate the vehicle safely in the corresponding particular mode.

Another aspect of the present disclosure includes the processor determines a driver's intention by determining whether the vehicle's current state satisfies the associated set of pre-defined transition conditions.

Another aspect of the present disclosure includes displaying, to the driver the first display indicates the switch between driving modes is confirmed to be initiated by the driver, that the vehicle is actuated into the safety region, and the driver is allowed continued control or given control of the vehicle; and displaying, to the driver the second display indicates the switch between driving modes is not confirmed to be initiated by the driver, that the vehicle is actuated out of the safety region, and an autonomous driving system of the systems of the vehicle will take control away from the driver, unless the driver actuates the vehicle into a vehicle state resulting in a transition between driving modes, via manual control of the vehicle, within a period of time.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Processor: By non-limiting example, is a hardware processor, as stated in claim 1 can be computer hardware, i.e. a logic circuitry that responds to and processes the basic instructions that drive a computer to implement the algorithm described in the present disclosure.

Vehicle State of the vehicle: A set of attribute values describing a condition of an autonomous vehicle at an instance in time and at a particular place during its motion is termed the 'state' of the vehicle at that moment. The set of attributes, can be defined as a vector, which are used to express the state of a vehicle are a position (x, y, z), a orientation ($\theta_x$, $\theta_y$, $\theta_z$), linear velocities ($v_x$, $v_y$, $v_z$) and angular velocities ($\omega_x$, $\omega_y$, $\omega_z$).

Pre-defined transition conditions that correspond uniquely to the vehicle's state: Logical tests governing whether to switch between modes, which depend on the vehicle state in such a way that no two tests can be simultaneously true. They are determined during the vehicle design phase, and are therefore pre-determined.

Status of the vehicle's environment: The condition of all attributes related to the environment outside of the vehicle. This can include, for example, the location of lanes and other vehicles.

Figure 10:
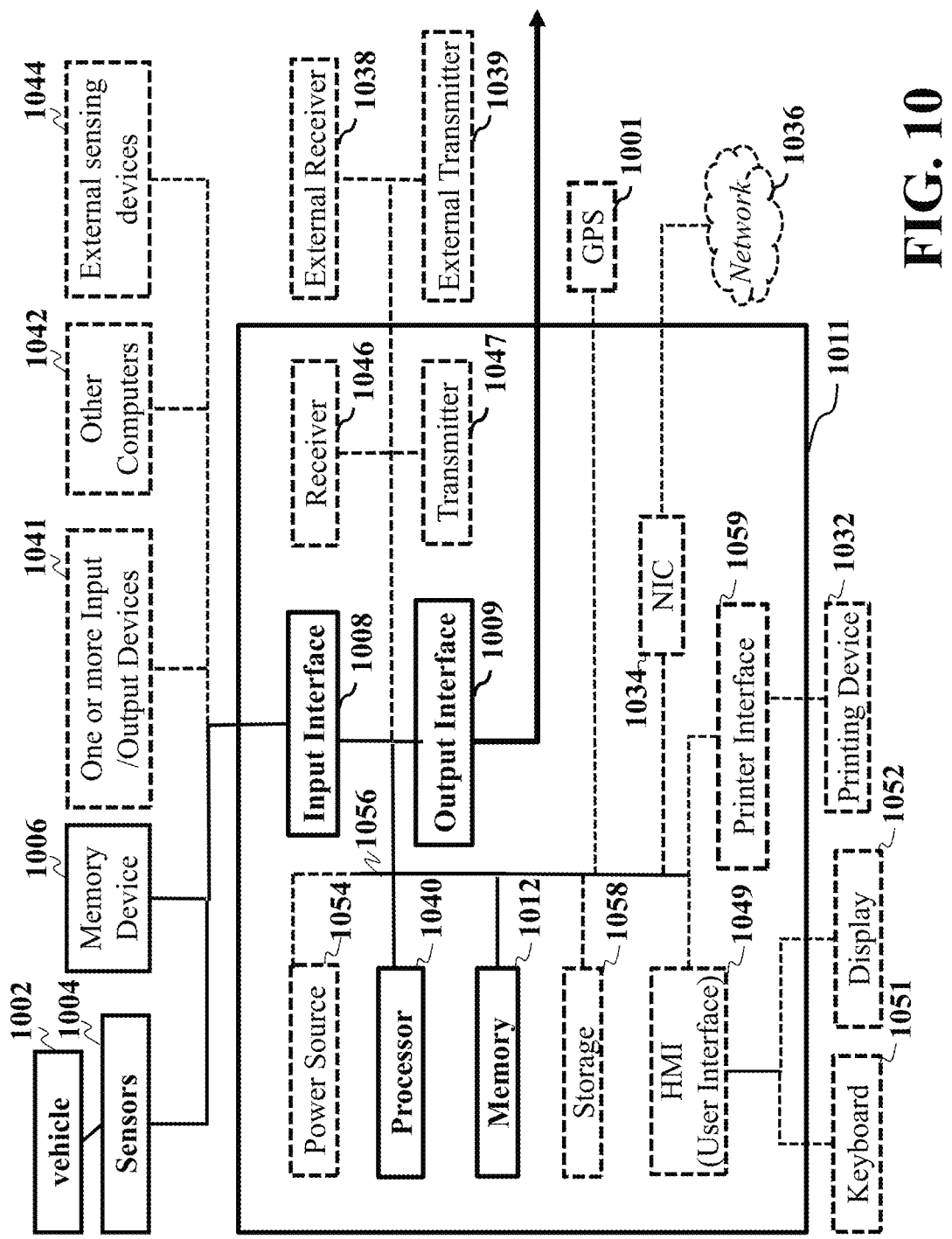
FIG. 10 is a block diagram of illustrating the method of FIG. 1A, that can be implemented using an alternate computer or processor, according to embodiments of the present disclosure.

FIG. 10 is a block diagram of illustrating the method of FIG. 1A, which can be implemented using an alternate computer or processor, according to embodiments of the present disclosure. The computer 1011 includes a processor 1040, computer readable memory 1012, storage 1058 and user interface 1049 with display 1052 and keyboard 1051, which are connected through bus 1056. For example, the user interface 1049 in communication with the processor 1040 and the computer readable memory 1012, acquires and stores the measuring data in the computer readable memory 1012 upon receiving an input from a surface, keyboard surface, of the user interface 1057 by a user.

Contemplated is that the memory 1012 can store instructions that are executable by the processor, historical data, and any data to that can be utilized by the methods and systems of the present disclosure. The processor 1040 can be a single core processor, a multi-core processor, a computing cluster, or any number of other configurations. The processor 1040 can be connected through a bus 1056 to one or more input and output devices. The memory 1012 can include random access memory (RAM), read only memory (ROM), flash memory, or any other suitable memory systems.

Still referring to FIG. 10, a storage device 1058 can be adapted to store supplementary data and/or software modules used by the processor. For example, the storage device 1058 can store historical device data and other related device data such as manuals for the devices, wherein the devices are sensing device capable of obtaining measured data as mentioned above regarding the present disclosure. Additionally, or alternatively, the storage device 1058 can store historical data similar to the measuring data. The storage device 1058 can include a hard drive, an optical drive, a thumb-drive, an array of drives, or any combinations thereof.

The system can be linked through the bus 1056 optionally to a display interface (not shown) adapted to connect the system to a display device (not shown), wherein the display device can include a computer monitor, camera, television, projector, or mobile device, among others.

The computer 1011 can include a power source 1054, depending upon the application the power source 1054 may be optionally located outside of the computer 1011. A printer interface 1059 can also be connected through bus 1056 and adapted to connect to a printing device 1032, wherein the printing device 1032 can include a liquid inkjet printer, solid ink printer, large-scale commercial printer, thermal printer, UV printer, or dye-sublimation printer, among others. A network interface controller (NIC) 1034 is adapted to connect through the bus 1056 to a network 1036, wherein measuring data or other data, among other things, can be rendered on a third party display device, third party imaging device, and/or third party printing device outside of the computer 1011.

Still referring to FIG. 10, the measuring data or other data, among other things, can be transmitted over a communication channel of the network 1036, and/or stored within the storage system 1058 for storage and/or further processing.

Further, the measuring data or other data may be received wirelessly or hard wired from a receiver 1046 (or external receiver 1038) or transmitted via a transmitter 1047 (or external transmitter 1039) wirelessly or hard wired, the receiver 1046 and transmitter 1047 are both connected through the bus 1056. The computer 1011 may be connected via an input interface 1008 to external sensing devices 1044 and external input/output devices 1041. The computer 1011 may be connected to other external computers 1042. Further, the computer 1011 can be connected a memory device 1006 and sensors 1004 and a control system for a vehicle 1002. An output interface 1009 may be used to output the processed data from the processor 1040.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure, the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A method comprising:
   receiving a transition indication from a processor, to switch a semi-autonomous vehicle from a driving mode to an other driving mode while a driver is driving the vehicle on a roadway, wherein the driving modes include an autonomous lane keeping mode, an autonomous lane change mode and a manual mode;
   using the processor that is configured to
       in response to receiving the transition indication, using, protocol data to assess (i) a status of the vehicle's environment, (ii) a vehicle state of the vehicle, and (iii) systems of the vehicle;
       selecting, a set of pre-defined transition conditions from a plurality of pre-defined transition conditions that correspond uniquely to the vehicle's state, based on one or more of the assessments;
       determining, whether a switch between driving modes has been initiated by the driver, by verifying if the vehicle's state satisfies the set of pre-defined transition conditions, in order to validate if the driver actuated the vehicle into or out of a safety region;
       generating, a set of displays, based on the determination whether the driver actuated the vehicle into or out of the safety region;
       selecting, as a first display of the set of displays based on a priority of the displays, if the driver actuated the vehicle into the safety region, or selecting a second display, if the driver actuated the vehicle out of the safety region;
       displaying either the first display or the second display to the driver, that results in either confirming the transition indication or initiating switching the vehicle from a manual driving mode to an autonomous driving mode, wherein the transitions between driving modes includes a first transition that is a switch from the manual driving mode to the lane-keeping mode, a second transition is a switch from the lane-keeping mode to the lane-change mode, a third transition is a switch from the lane-keeping mode to the manual driving mode, a fourth transition is a switch from lane-change to manual mode, and a switch from the lane-changing mode back to the lane keeping mode is based on whether a lane change has been completed.

2. The method of claim 1, wherein the first transition includes a set of pre-defined transition conditions that include whether the vehicle is within a predefined distance range approximate to a center of a lane of the roadway, and that the vehicle is moving at a predefined speed range in lateral direction, so as to safely engage an autonomous tracking module of a system of the vehicle.

3. The method of claim 2, wherein when the system of the vehicle is in the manual driving mode, and the processor confirms if the vehicle is actuated into the safety region, then the processor determines that an autonomous take-over has been initiated, such that the safety region is a set of all states that ensures that an autonomous controller of a system of the vehicle can safely take over control and track a center-lane and enforce safety constraints.

4. The method of claim 1, wherein the second transition includes a set of pre-defined transition conditions that include whether an amount of a cost, based on a predefined cost function, to change a lane or to track a current lane by the vehicle, and whether a cost of tracking a center lane is greater than a cost of tracking a minimal jerk lane-change trajectory based on a predefined cost range.

5. The method of claim 4, wherein when the system of the vehicle is in the lane-keeping mode, the processor confirms if the vehicle is actuated into the safety region, upon confirmation, the processor further performs a first additional predefined transition condition to determine if a lane-change has been initiated, such that a second additional predefined transition condition compares an amount of an effort needed to resume lane-keeping versus an amount of effort needed to perform a lane change, and if, in addition to the first additional predefined transition condition, less effort is needed to switch lanes, then, the processor determines that a lane change has been initiated.

6. The method of claim 1, wherein the third transition includes a set of pre-defined transition conditions that include whether a vehicle state has left a predefined safety region in which pre-defined transition constraints associated with a uniform control of the vehicle is no longer be enforceable by the processor, which the processor then considers the manual driving mode as an error state, or a driver takeover of the vehicle.

7. The method of claim 6, wherein the predefined safety region is a set of all vehicle states that ensure that an autonomous controller of the systems of the vehicle will track a center-lane and enforce predefined safety transition constraints, and when the system of the vehicle is in the lane-keeping mode, the processor confirms if a predefined safety transition constraint has been violated, if the predefined safety transition constraint is violated, and simultaneously a lane change has not been initiated, the processor determines that a manual take-over has been initiated.

8. The method of claim 1, wherein the fourth transition includes a set of pre-defined transition conditions that include whether a vehicle state has left a predefined safety region in which pre-defined transition constraints associated with a uniform control of the vehicle is no longer be enforceable by the processor, which the processor then considers the manual driving mode as an error state, or a driver takeover of the vehicle.

9. The method of claim 8, wherein the predefined safety region is a set of all vehicle states that ensure that an autonomous controller of the systems of the vehicle will do a lane change and enforce predefined safety transition constraints, and when the system of the vehicle is in the lane-change mode, the processor confirms if the predefined safety transition constraint has been violated, and upon confirmation, the processor determines that a manual take-over has been initiated.

10. The method of claim 1, wherein the lane change for the switch from the lane-changing mode back to the lane keeping mode, is determined to be completed when a lane change trajectory converges to a center of a new lane of the roadway.

11. The method of claim 1, wherein the transitions between driving modes are activated by satisfying pre-defined transition conditions that are based on membership of admissible sets.

12. The method of claim 11, wherein the predefined transition conditions are constraints characterizing these admissible sets and structured to determine whether the vehicle state can safely initiate a transition to a particular driving mode.

13. The method of claim 12, wherein the safety is defined using constraints, which are determined by a designer of a switching system associated with the systems of the vehicle.

14. The method of claim 1, wherein the driver is capable of achieving all transitions between driving modes, via manual control of the vehicle, by moving a steering wheel attached to a rack of the vehicle, in order to actuate the vehicle into a vehicle state resulting in a transition between driving modes.

15. The method of claim 1, wherein the safety region represents a set of vehicle states from which the vehicle is to operate the vehicle safely in the corresponding particular driving mode.

16. The method of claim 1, wherein the processor determines a driver's intention by determining whether the vehicle's current state satisfies the associated set of pre-defined transition conditions.

17. The method of claim 1, wherein
displaying, to the driver the first display indicates the switch between driving modes is confirmed to be initiated by the driver, that the vehicle is actuated into the safety region, and the driver is allowed continued control or given control of the vehicle; and
displaying, to the driver the second display indicates the switch between driving modes is not confirmed to be initiated by the driver, that the vehicle is actuated out of the safety region, and an autonomous driving system of the systems of the vehicle will take control away from the driver, unless the driver actuates the vehicle into a vehicle state resulting in a transition between driving modes, via manual control of the vehicle, within a period of time.

18. A system comprising one or more processors configured to: receive a transition indication to switch a semi-autonomous vehicle from a driving mode to an other driving mode while a driver is driving the vehicle on a roadway, wherein the driving modes include an autonomous lane keeping mode, an autonomous lane change mode and a manual mode;
in response to receiving the request, use protocol data to assess (i) a status of the vehicle's environment, (ii) a vehicle state of the vehicle, and (iii) systems of the vehicle;
select, a set of pre-defined transition conditions from a plurality of pre-defined transition conditions that correspond to the vehicle's state, based on one or more of the assessments;
determine, whether a switch between driving modes has been initiated by the driver, by verifying if the vehicle's state satisfies the set of pre-defined transition conditions, in order to validate if the driver actuated the vehicle into or out of a safety region;
generate, a set of displays, based on the determination whether the driver actuated the vehicle into or out of the safety region;
select, as a first display of the set of displays based on a priority of the displays, if the driver actuated the vehicle into the safety region, or selecting a second display, if the driver actuated the vehicle out of the safety region;
display either the first display or the second display to the driver, that results in either confirming the transition indication or initiating switching the vehicle from a manual driving mode to an autonomous driving mode,
wherein the transitions between driving modes includes a first transition that is a switch from the manual driving mode to the lane-keeping mode, a second transition is a switch from the lane-keeping mode to the lane-change mode, a third transition is a switch from the lane-keeping mode to the manual driving mode, a fourth transition is a switch from lane-change to manual mode, and a switch from the lane-changing mode back to the lane keeping mode is based on whether a lane change has been completed, wherein the driver is capable of achieving all transitions between driving modes, via manual control of the vehicle, by moving a steering wheel attached to a rack of the vehicle, in order to actuate the vehicle into a vehicle state resulting in a transition between driving modes, wherein the first display indicates the switch between driving modes is confirmed to be initiated by the driver, that the vehicle is actuated into the safety region, and the driver is allowed continued control or given control of the vehicle, and wherein the second display indicates the switch between driving modes is not confirmed to be initiated by the driver, that the vehicle is actuated out of the safety region, and an autonomous driving system of the systems of the vehicle will take control away from the driver, unless the driver actuates the vehicle into a vehicle state resulting in a transition between driving modes, via manual control of the vehicle.

19. A method comprising:
receiving a transition indication from a processor, to switch a semi-autonomous vehicle from a driving mode to an other driving mode while a driver is driving the vehicle on a roadway, wherein the driving modes include an autonomous lane keeping mode, an autonomous lane change mode and a manual mode;
using the processor that is configured to
in response to receiving the transition indication, using, protocol data to assess (i) a status of the vehicle's environment, (ii) a vehicle state of the vehicle, and (iii) systems of the vehicle;
selecting, a set of pre-defined transition conditions from a plurality of pre-defined transition conditions that correspond uniquely to the vehicle's state, based on one or more of the assessments;
determining, whether a switch between driving modes has been initiated by the driver, by verifying if the vehicle's state satisfies the set of pre-defined transition conditions, in order to validate if the driver actuated the vehicle into or out of a safety region;
generating, a set of displays, based on the determination whether the driver actuated the vehicle into or out of the safety region;
selecting, as a first display of the set of displays based on a priority of the displays, if the driver actuated the vehicle into the safety region, or selecting a second display, if the driver actuated the vehicle out of the safety region;
displaying either the first display or the second display to the driver, that results in either confirming the transition indication or initiating switching the vehicle from a manual driving mode to an autonomous driving mode, wherein the second transition includes a set of pre-defined transition conditions that include whether an amount of a cost, based on a predefined cost function, to change a lane or to track a current lane by the vehicle, and whether a cost of tracking a center lane is greater than a cost of tracking a minimal jerk lane-change trajectory based on a predefined cost range, wherein when the system of the vehicle is in the lane-keeping mode, the processor confirms if the vehicle is actuated into the safety region, upon confirmation, the processor further performs a first additional predefined transition condition to determine if a lane-change has been initiated, such that a second additional predefined transition condition compares an amount of an effort needed to resume lane-keeping versus an amount of effort needed to perform a lane change, and if, in addition to the first additional predefined transition condition, less effort is needed to switch lanes, then, the processor determines that a lane change has been initiated.

20. A method comprising:
receiving a transition indication from a processor, to switch a semi-autonomous vehicle from a driving mode to an other driving mode while a driver is driving the vehicle on a roadway, wherein the driving modes include an autonomous lane keeping mode, an autonomous lane change mode and a manual mode;
using the processor that is configured to
in response to receiving the transition indication, using, protocol data to assess (i) a status of the vehicle's environment, (ii) a vehicle state of the vehicle, and (iii) systems of the vehicle;
selecting, a set of pre-defined transition conditions from a plurality of pre-defined transition conditions that correspond uniquely to the vehicle's state, based on one or more of the assessments;
determining, whether a switch between driving modes has been initiated by the driver, by verifying if the vehicle's state satisfies the set of pre-defined transition conditions, in order to validate if the driver actuated the vehicle into or out of a safety region;
generating, a set of displays, based on the determination whether the driver actuated the vehicle into or out of the safety region;
selecting, as a first display of the set of displays based on a priority of the displays, if the driver actuated the vehicle into the safety region, or selecting a second display, if the driver actuated the vehicle out of the safety region;
displaying either the first display or the second display to the driver, that results in either confirming the transition indication or initiating switching the vehicle from a manual driving mode to an autonomous driving mode, wherein the third transition includes a set of pre-defined transition conditions that include whether a vehicle state has left a pre-defined safety region in which pre-defined transition constraints associated with a uniform control of the vehicle is no longer be enforceable by the processor, which the processor then considers the manual driving mode as an error state, or a driver takeover of the vehicle, wherein the predefined safety region is a set of all vehicle states that ensure that an autonomous controller of the systems of the vehicle will track a center-lane and enforce predefined safety transition constraints, and when the system of the vehicle is in the lane-keeping mode, the processor confirms if a predefined safety transition constraint has been violated, if the predefined safety transition constraint is violated, and simultaneously a lane change has not been initiated, the processor determines that a manual take-over has been initiated.

21. A method comprising:
receiving a transition indication from a processor, to switch a semi-autonomous vehicle from a driving mode to an other driving mode while a driver is driving the vehicle on a roadway, wherein the driving modes include an autonomous lane keeping mode, an autonomous lane change mode and a manual mode;
using the processor that is configured to
in response to receiving the transition indication, using, protocol data to assess (i) a status of the vehicle's environment, (ii) a vehicle state of the vehicle, and (iii) systems of the vehicle;
selecting, a set of pre-defined transition conditions from a plurality of pre-defined transition conditions that correspond uniquely to the vehicle's state, based on one or more of the assessments;
determining, whether a switch between driving modes has been initiated by the driver, by verifying if the vehicle's state satisfies the set of pre-defined transition conditions, in order to validate if the driver actuated the vehicle into or out of a safety region;
generating, a set of displays, based on the determination whether the driver actuated the vehicle into or out of the safety region;
selecting, as a first display of the set of displays based on a priority of the displays, if the driver actuated the vehicle into the safety region, or selecting a second display, if the driver actuated the vehicle out of the safety region;
displaying either the first display or the second display to the driver, that results in either confirming the transition indication or initiating switching the vehicle from a manual driving mode to an autonomous driving mode, wherein the fourth transition includes a set of pre-defined transition conditions that include whether a vehicle state has left a pre-defined safety region in which pre-defined transition constraints associated with a uniform control of the vehicle is no longer be enforceable by the processor, which the processor then considers the manual driving mode as an error state, or a driver takeover of the vehicle, wherein the predefined safety region is a set of all vehicle states that ensure that an autonomous controller of the systems of the vehicle will do a lane change and enforce predefined safety transition constraints, and when the system of the vehicle is in the lane-change mode, the processor confirms if the predefined safety transition constraint has been violated, and upon confirmation, the processor determines that a manual take-over has been initiated.

* * * * *